US009184457B2

(12) United States Patent
Tsuchiya et al.

(10) Patent No.: US 9,184,457 B2
(45) Date of Patent: Nov. 10, 2015

(54) SOLID OXIDE FUEL CELL DEVICE

(75) Inventors: Katsuhisa Tsuchiya, Kitakyushu (JP);
Kiyotaka Nakano, Kitakyushu (JP);
Tsukasa Shigezumi, Kitakyushu (JP);
Toshiharu Ooe, Kitakyushu (JP);
Yoshiyuki Kawamura, Kitakyushu (JP)

(73) Assignee: TOTO LTD., Fukuoka (JP)

( * ) Notice: Subject to any disclaimer, the term of this patent is extended or adjusted under 35 U.S.C. 154(b) by 1026 days.

(21) Appl. No.: 13/262,032

(22) PCT Filed: Mar. 31, 2010

(86) PCT No.: PCT/JP2010/055910
§ 371 (c)(1),
(2), (4) Date: Sep. 29, 2011

(87) PCT Pub. No.: WO2010/114043
PCT Pub. Date: Oct. 7, 2010

(65) Prior Publication Data
US 2012/0021319 A1    Jan. 26, 2012

(30) Foreign Application Priority Data

Mar. 31, 2009  (JP) ................................. 2009-086743

(51) Int. Cl.
*H01M 8/06* (2006.01)
*C01B 3/38* (2006.01)
(Continued)

(52) U.S. Cl.
CPC ............. *H01M 8/0612* (2013.01); *C01B 3/382* (2013.01); *C01B 3/384* (2013.01);
(Continued)

(58) Field of Classification Search
IPC .................... H01M 8/04365, 8/04731, 8/04753, H01M 8/0612, 8/04679, 8/243, 8/04328, H01M 8/04537, 8/10, 8/04701, 2008/1293; Y02E 60/525, 60/50; C01B 3/382
See application file for complete search history.

(56) References Cited

U.S. PATENT DOCUMENTS
2005/0112419 A1 * 5/2005 Zheng et al. .................... 429/13
(Continued)

FOREIGN PATENT DOCUMENTS

JP    1-286259 A    11/1989
(Continued)

OTHER PUBLICATIONS

Extended European Search Report in corresponding European Application No. 10758814.7, dated Apr. 3, 2014, 8 pages.
(Continued)

*Primary Examiner* — Alix Eggerding
(74) *Attorney, Agent, or Firm* — Brinks Gilson & Lione

(57) ABSTRACT

The SOFC of the present invention has a plurality of individual solid oxide fuel cells (84) disposed within an generating chamber (10), a fuel supply unit (38) for supplying fuel to the individual solid oxide fuel cells, a temperature sensor (142) for measuring the temperature of the generating chamber (T1), and a control section (110) for changing the amount of fuel supplied in response to an amount of generation required based on control characteristics for supplying fuel, wherein the control section is furnished with a temperature band for monitoring purposes, having a minimum temperature value (Ta) and a maximum temperature value (Tb) for adaptive control, predetermined based on a minimum amount and maximum amount of rated electrical generation, and a maximum temperature value for adaptive control in response to anomalies, which is higher than the maximum temperature value (Tb) of the adaptive control temperature band, and a minimum temperature value for adaptive control in response to anomalies, which is lower than the minimum temperature value (Ta) of the adaptive control temperature band, and the control section is furnished with: an anomaly response control section for executing anomaly response control by restricting operation of the fuel cell when the generating chamber temperature (T1) is higher than the maximum temperature value for anomaly response control or lower than the minimum temperature value for anomaly response control, and with an adaptive control section for executing adaptive control by correcting the amount of fuel supplied based on a temperature signal from the temperature measurement sensor so that the generating chamber temperature (T1) is kept within the temperature band when the generating chamber temperature (T1) exceeds the minimum temperature value (Ta) or maximum temperature (Tb) for adaptive control and goes outside the temperature band.

13 Claims, 17 Drawing Sheets

(51) Int. Cl.
*H01M 8/04* (2006.01)
*H01M 8/24* (2006.01)
*H01M 8/12* (2006.01)

(52) U.S. Cl.
CPC ..... *H01M 8/04365* (2013.01); *H01M 8/04731* (2013.01); *H01M 8/04753* (2013.01); *C01B 2203/0233* (2013.01); *C01B 2203/0244* (2013.01); *C01B 2203/0261* (2013.01); *C01B 2203/066* (2013.01); *C01B 2203/1058* (2013.01); *C01B 2203/1064* (2013.01); *C01B 2203/1258* (2013.01); *C01B 2203/1604* (2013.01); *C01B 2203/1609* (2013.01); *C01B 2203/1619* (2013.01); *C01B 2203/1685* (2013.01); *H01M 8/04679* (2013.01); *H01M 8/243* (2013.01); *H01M 2008/1293* (2013.01); *Y02E 60/50* (2013.01); *Y02E 60/525* (2013.01)

(56) References Cited

U.S. PATENT DOCUMENTS

2007/0141413 A1\* 6/2007 Nielsen et al. .................. 429/22
2009/0023023 A1\* 1/2009 Miwa .............................. 429/24

FOREIGN PATENT DOCUMENTS

| | | |
|---|---|---|
| JP | 05-003041 A | 1/1993 |
| JP | 2003-115315 A | 4/2003 |
| JP | 2004-164909 A | 6/2004 |
| JP | 2004-349214 A | 12/2004 |
| JP | 2006-032262 A | 2/2006 |
| JP | 2006-164995 A | 6/2006 |
| JP | 2006-331990 A | 12/2006 |
| JP | 2007-509470 A | 4/2007 |
| JP | 2008-153149 A | 7/2008 |
| JP | 2008-218236 A | 9/2008 |
| JP | 2009-021194 A | 1/2009 |
| WO | WO 2005/038973 A1 | 4/2005 |

OTHER PUBLICATIONS

International Search Report for International Application No. PCT/JP2010/055910, dated Jul. 20, 2010, 2 pages.
Written Opinion of the International Searching Authority for International Application No. PCT/JP2010/055910, dated Jul. 20, 2010, 5 pages.
International Preliminary Report on Patentability for International Application No. PCT/JP2010/055910, dated Nov. 15, 2011, 6 pages.

\* cited by examiner

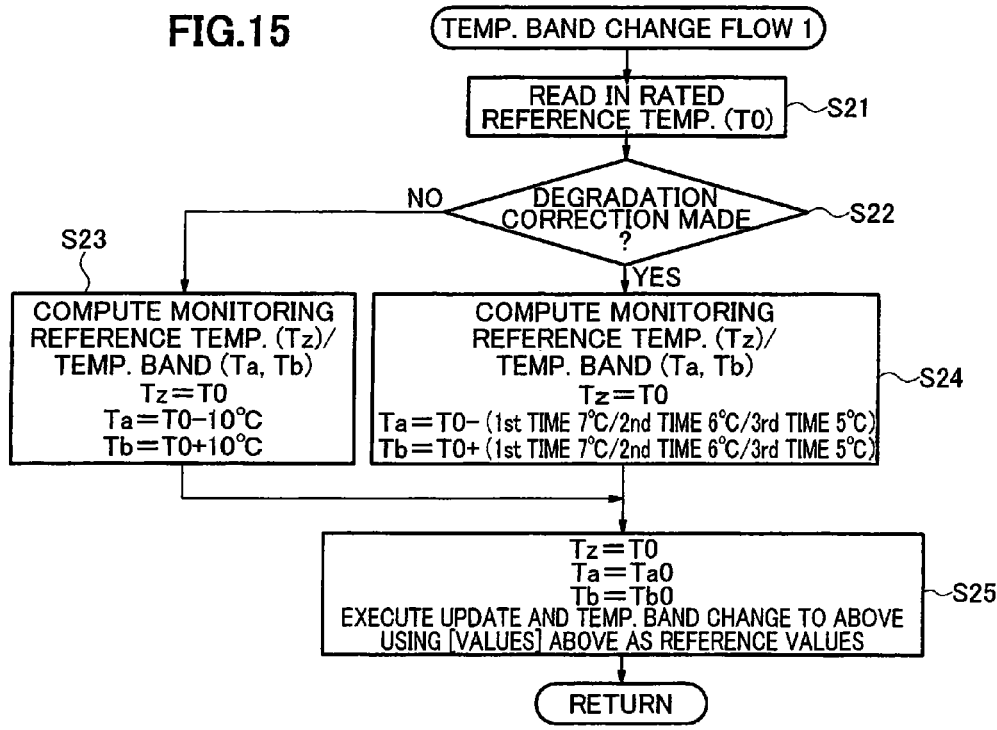
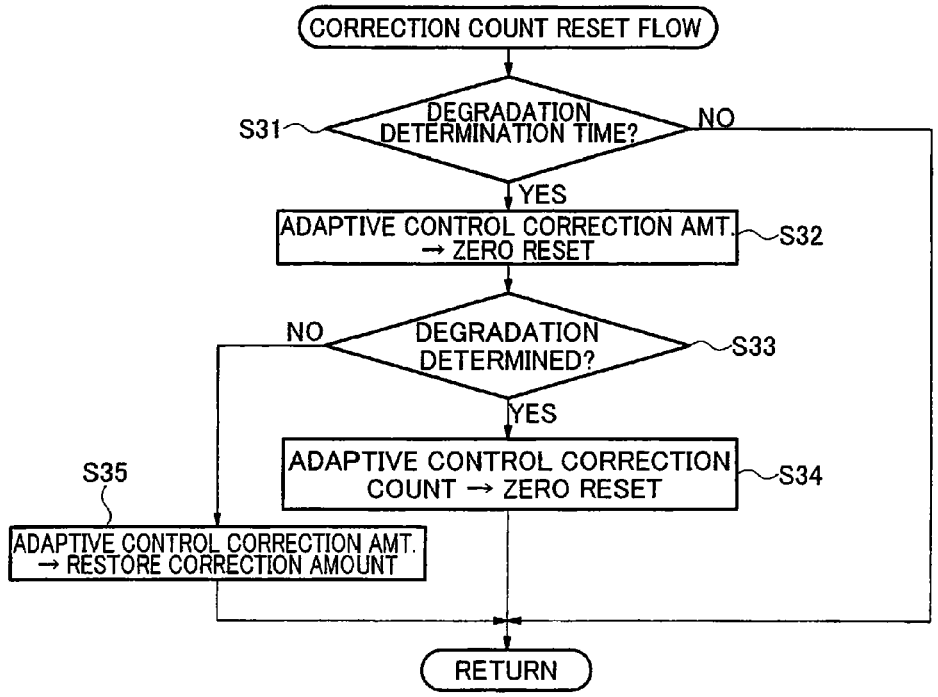

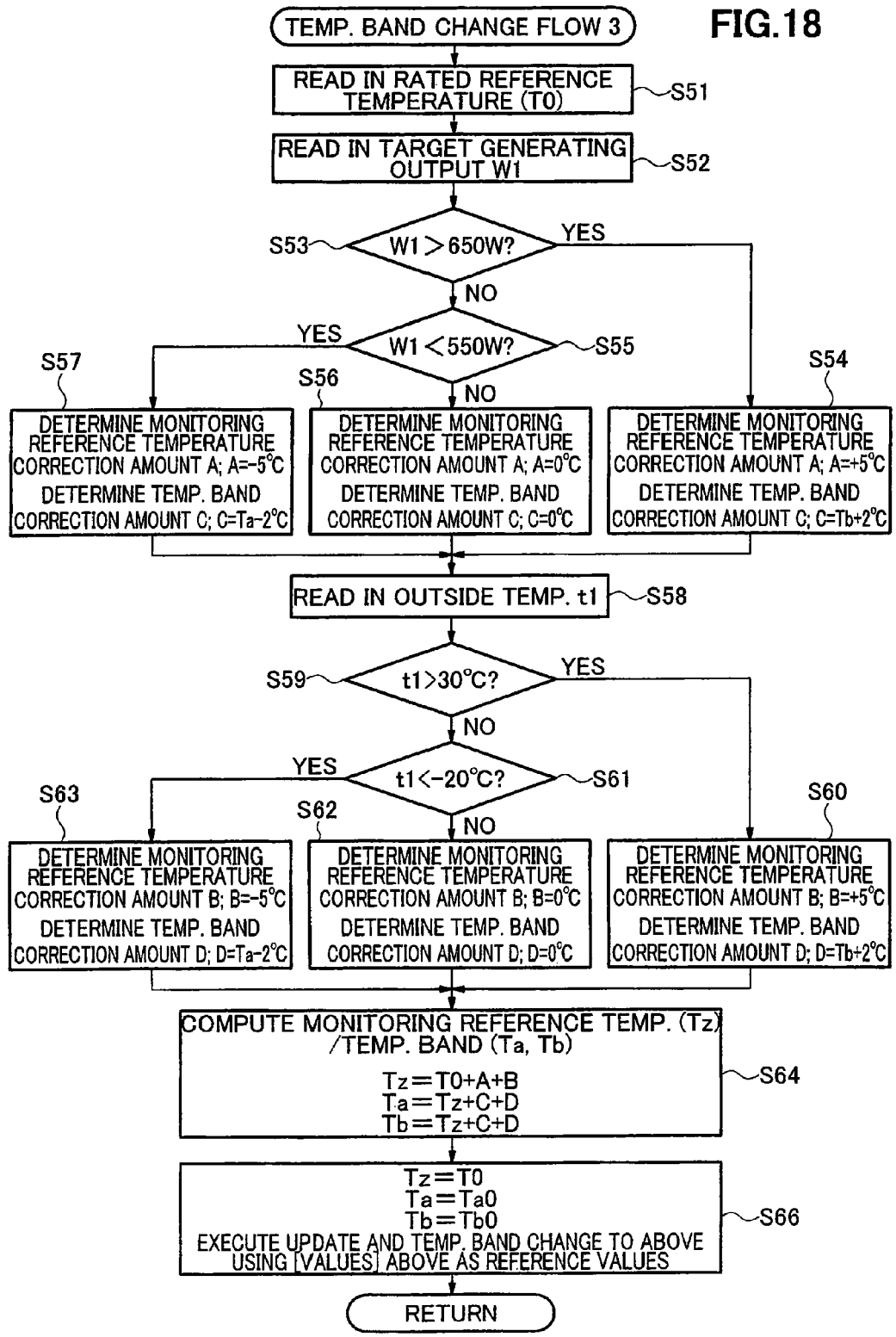

SOLID OXIDE FUEL CELL DEVICE

TECHNICAL FIELD

The present invention relates to a solid oxide fuel cell device, and more particularly to a solid oxide fuel cell device capable of changing its electrical generation output value in accordance with the amount of generation required.

BACKGROUND ART

Solid oxide fuel cell device ("SOFC" below) is a fuel cell device for generating electricity by causing an electrical generating reaction to take place at a relatively high temperature using an oxide ion electrically conductive solid electrolyte as an electrolyte, with electrodes attached on both sides thereof, and with fuel gas supplied to one side thereof and an oxidant (air, oxygen, etc.) supplied to the other side thereof.

In such SOFC, steam or $CO_2$ is produced by the reaction between oxygen ions passed through the oxide ion conducting solid electrolyte with the fuel, thereby generating electrical and thermal energy. The electrical energy is extracted from the SOFC, where it is used for various electrical purposes. At the same time, thermal energy is transferred to the fuel, SOFC, oxidant, etc., and used to raise the temperature thereof.

It was common in the conventional SOFC to operate in a state whereby electrical generation output was held fixed, but when the SOFC is installed in facilities where there is virtually no electrical demand at night, or where there are large changes in electrical demand between day and night, etc., there is a need to vary the electrical generation output value in accordance with the amount of electrical generation required.

Patent Document 1 proposes an SOFC in which the SOFC operating condition can be stabilized in a short time period by controlling the SOFC to prevent sudden changes in SOFC reaction temperature when the electrical generation value is changed in accordance with the amount of electrical generation required.

In other words, in the SOFC of Patent Document 1, sudden changes in SOFC reaction temperature can be prevented by controlling the amount of oxidant supply and/or the oxidant temperature so that the SOFC reaction temperature T0 prior to the change in generation output at SOFC reaction temperature T satisfies "$T0-10 \leq T \leq T0+10$."

PRIOR ART DOCUMENTS

Patent Documents

Patent Document 1: JP-A-2003-115315

SUMMARY OF THE INVENTION

Holding the SOFC reaction temperature T in a predetermined range (±10° C.) centered on the pre-electrical generation output change reaction temperature T0, as described in Patent Document 1 above, is itself a useful technology when compared to simply optimizing SOFC operating conditions by appropriately controlling various SOFC operating parameters.

It happens that when producing a manufactured SOFC product, SOFC cells are ceramic products comprising a plurality of layers of differing materials, meaning that from the standpoint of molding or firing, it is extremely difficult to fabricate the fuel cells, several tens or several hundreds of which go into a single SOFC, one at a time in a stable manner. Furthermore, there is variation in material composition and a minute amount of warpage in the shapes of each fuel cell. As a result, individual differences arise between individual fuel cells, which lead to the problem of major individual differences between SOFC devices (systems) furnished with such large numbers of individual fuel cells. However, it is extremely difficult to control SOFC operation so as not to impart major damage on individual fuel cells by taking these uncertain individual differences into account.

Specifically, when load following by changing the electrical generation output value in accordance with the amount of generation required, it is necessary, for example, to reduce the amount of fuel supplied to restrain the consumption of wasteful energy when the amount of generation required declines, but when doing so it is necessary to accurately control to reduce the fuel supply amount based on fuel supply control characteristics determined ahead of time from experimental values at the development stage. However, when load following it can occur that the electrical generating reaction does not go according to target due to uncertain individual differences in the above-described individual fuel cells themselves, such that the temperatures of the individual fuel cells depart from the control target desired temperature range at which the generating reaction occurs. When the generating reaction is carried out in such a non-ideal state (outside the desirable temperature band), a large burden is placed on the individual fuel cells, leading to the problem of reduced individual fuel cell durability. To produce a product, these types of problems inherent to the SOFC must be solved.

Furthermore, other factors causing the SOFC generating reaction to depart from the optimal temperature band can include abnormally low or high temperature outside air or abnormally high humidity or dryness; the fuel combustion state or reforming state may depart from the targeted stable state, leading to a departure of the individual fuel cell temperature from the desired temperature band and lowering the durability of the individual fuel cells.

In the SOFC of Patent Document 1, sudden fluctuations in temperature of the individual fuel cells before and after changing electrical generation output can be restrained, but the new problems described above can not be completely solved. Specifically, in the SOFC of Patent Document, sudden changes in reaction temperature are prevented by seeing that in no case does the post reaction-change temperature T change by more than ±10° C. from the pre-electrical generation output change temperature T0. Therefore since the current reaction temperature T is changed to a T0 after changing electrical generation output, the individual fuel cells temperature bands gradually drift apart. Thus the SOFC of Patent Document 1 is not capable of maintaining temperature band optimal for the generating reaction, even if damage to individual fuel cells associated with sudden changes in temperature can be prevented. As a result, in the SOFC of Patent Document 1, the reaction temperature gradually departs from the temperature band ideal for the electrical generation reaction due to individual differences between individual fuel cells, even if an effort is made to accurately control based on fuel cell supply control characteristics, so that because the durability of individual fuel cells is caused to decline, the problems discussed above cannot be solved. I.e., the SOFC of Patent Document 1 is not able to solve the problem discovered by the present inventors, which is that the temperature of individual fuel cells drifts from the ideal temperature band, due to individual differences between individual fuel cells.

It is therefore an object of the present invention to provide a solid oxide fuel cell device (SOFC) in which load following can be achieved by changing the electrical generation output in accordance with the amount of generation required, so that even if individual differences among individual fuel cells or major atmospheric environmental changes or the like occur, they can be absorbed by implementing adaptive control, so that the reaction temperature can be maintained at the optimal temperature band for the generating reaction and expected performance can be achieved, while degradation in individual fuel cell durability is prevented.

The above object is achieved according to the present invention by providing a solid oxide fuel cell device capable of changing generation output value in response to amount of generation required, comprising a plurality of individual solid oxide fuel cells disposed within a generating chamber; a fuel supply device for supplying fuel to the plurality of individual solid oxide fuel cells, a thermometer for measuring the temperature of the generating chamber (T1), and a control device for changing at least the amount of fuel supplied by a fuel supply device in response to an amount of generation required based on predetermined control characteristics for supplying fuel, wherein the control device is furnished with a temperature monitoring band, having a minimum temperature value (Ta) and a maximum temperature value (Tb) for adaptive control, predetermined based on a minimum amount and maximum amount of rated electrical generation by the solid oxide fuel cell device, and a maximum temperature value for adaptive control in response to anomalies, which is higher than the maximum temperature value (Tb) of the adaptive control temperature band, and a minimum temperature value for adaptive control in response to anomalies, which is lower than the minimum temperature value (Ta) of the adaptive control temperature band, and the control device is furnished with an anomaly response control device for executing anomaly response control by restricting operation of the fuel cell device when the generating chamber temperature (T1) is higher than the maximum temperature value for anomaly response control or lower than the minimum temperature value for anomaly response control, and with an adaptive control device for executing adaptive control by correcting the amount of fuel supplied based on a temperature signal from the thermometer so that the generating chamber temperature (T1) is kept within the temperature band when the generating chamber temperature (T1) exceeds the minimum temperature value (Ta) or the maximum temperature (Tb) for adaptive control and goes outside the temperature band.

According to the present invention thus constituted, the control device is furnished with a temperature band with a minimum temperature value and a maximum temperature value for adaptive control, predetermined based on a minimum amount and maximum amount of rated electrical generation by the solid oxide fuel cell and, furthermore, even when fuel is supplied based on control characteristics for supplying fuel, the adaptive control device corrects the amount of fuel supplied based on a temperature signal from the thermometer so that the generating chamber temperature is kept within the temperature band when the generating chamber temperature exceeds a minimum temperature value or maximum temperature and goes outside the temperature band due to differences between individual fuel cells. As a result, in the present invention, the generating chamber temperature is constantly kept within a temperature band even if individual differences arise between individual fuel cells such that the temperature of the generating chamber changes, therefore the generating reaction can be effectively carried out.

Moreover, in the present invention, while it may occur that the combustion state or reforming state changes so that the generating chamber temperature goes outside the temperature band due to large changes in outside air temperature or humidity, the execution of adaptive control to absorb differences between individual fuel cells makes it possible to absorb even such large changes in the atmospheric environment, maintaining an ideal generating chamber temperature range.

Also, because the adaptive control of the present invention is a simple control which corrects the fuel supply amount to stay within the generating chamber minimum temperature value and maximum temperature value of the temperature band, no complex control is performed, and the generating reaction can be carried out in a simple and extremely effective way.

Furthermore, because in the present invention, an operation of the fuel cell device is restricted (operation stopped, electrical generation stopped, combustion gas supply amount reduced, warnings issued, etc.) by an anomaly response control device when the generating chamber temperature (T1) is higher than an anomaly response control maximum temperature value or lower than an anomaly response control minimum temperature value, the individual fuel cells can, by implementing anomaly response control, be reliably prevented from going into an anomalous state (e.g., in which individual fuel cells failed), even when anomalous states occur in which the control characteristics for fuel supply cannot adapt to changes in atmospheric environment (temperature, humidity, etc.) or to individual fuel cell differences by adaptive control.

In the preferred embodiment of the present invention, the adaptive control device has a temperature band changing device for changing the temperature band by changing the minimum temperature value (Ta) and/or the maximum temperature value (Tb) under predetermined conditions.

According to the present invention thus constituted, the adaptive control device has a temperature band changing device for changing the temperature band by changing the minimum temperature value (Ta) and/or the maximum temperature value (Tb) under predetermined conditions, therefore a much more precise adaptive control is possible relative to individual fuel cell degradation, outside air temperature, amount of generation required (load), and various other states.

In the preferred embodiment of the present invention, the temperature band changing device changes the minimum temperature value (Ta) and/or the maximum temperature value (Tb) in response to outside air temperature.

According to the present invention thus constituted, a temperature band adapted to the outside air temperature can be set, thereby enabling optimal adaptive control.

In the preferred embodiment of the present invention, the temperature band changing device preferably changes the minimum temperature value (Ta) and/or the maximum temperature value (Tb) in response to the amount of fluctuation in the amount of generation required.

According to the present invention thus constituted, a temperature band adapted to the amount of fluctuation in the amount of generation required (load) can be set, therefore even if the amount of generation required changes suddenly, mis-correction or delayed correction of the fuel supply amount, etc., can be restrained.

In the preferred embodiment of the present invention, the temperature band changing device changes the temperature band to the lower temperature side during low load times when the amount of generation required is low.

According to the present invention thus constituted, temperature gains in the individual fuel cells can be quickly reduced during low load periods when the amount of generation required is low, so that damage to cells can be reliably prevented.

In the preferred embodiment of the present invention, the solid oxide fuel cell device further comprises a degradation determining device for determining degradation in the individual fuel cells, wherein when the degradation determining device determines that a fuel cell has degraded, the adaptive control device causes the amount of correction to the fuel supply amount to increase or decrease and the temperature band changing device changes the temperature band.

According to the present invention thus constituted, miscorrection of the fuel supply amount in conjunction with degradation can be reliably prevented even if an individual fuel cell degrades.

In the preferred embodiment of the present invention, the temperature band changing device sets the minimum temperature value (Ta) and maximum temperature value (Tb) of the temperature band centered on a reference temperature, which is the temperature of the individual fuel cell measured after degradation.

According to the present invention thus constituted, the minimum temperature value and maximum temperature value of the temperature band are set centered on the temperature of the individual fuel cells measured after degradation, thereby enabling adaptive control taking into account individual differences between degraded individual fuel cells, so that damage to individual fuel cells can be reliably restrained.

In the preferred embodiment of the present invention, the temperature band changing device carries out changes so that the width of the temperature band decreases when the degradation determination device has determined that an individual fuel cell has degraded.

According to the present invention thus constituted, temperature changes in degraded individual fuel cells can be much more fully restrained, so that damage to individual fuel cells associated with temperature changes can be reduced and individual fuel cell durability can be maintained.

In the preferred embodiment of the present invention, when individual fuel cells degrade, the adaptive control device halts adaptive control within a predetermined time period, then after that predetermined time elapses, executes adaptive control in the changed temperature band.

According to the present invention thus constituted, adaptive control is halted during a predetermined period when individual fuel cells degrade, therefore false determinations caused by the fluctuating portion of the correction amount due to the increase or reduction of the fuel supply correction amount can be prevented.

In the preferred embodiment of the present invention, after the number of iterations of reducing corrections to reduce the amount of fuel supplied in order to lower the generating chamber temperature when the generating chamber temperature exceeds the maximum temperature (Tb) and the number of iterations of increasing corrections to increase the amount of fuel supplied in order to raise the generating chamber temperature when the generating chamber temperature exceeds the minimum temperature value (Ta) respectively cancel each other out, then once the numbers reach a predetermined number of iterations, the adaptive control device restricts the amount of fuel supplied thereafter in the same direction and, furthermore, when individual fuel cells degrade and the temperature band is changed, the adaptive control device resets the number of temperature reducing corrections and the number of temperature increasing corrections.

According to the present invention thus constituted, the temperature band is reset centered on a reference temperature, and since the number of temperature reducing corrections and the number of temperature increasing corrections have been reset, the amount of correction to the fuel supply amount is appropriate, and optimal adaptive control can be achieved, even after degradation of a fuel cell.

In the preferred embodiment of the present invention, the adaptive control device has a correction amount changing device for changing the amount of correction to the amount of fuel supplied under predetermined conditions According to the present invention thus constituted, the amount of correction to the fuel supply amount is changed by the correction amount changing device under predetermined conditions, therefore the amount of correction to the fuel supply amount can be optimally changed, which enables convergence characteristic relative to outside air temperature and holding characteristic to be improved, and improves the restraint of individual fuel cell degradation and electrical generation performance.

In the preferred embodiment of the present invention, the solid oxide fuel cell device further comprises a degradation determining device for determining degradation in individual fuel cells, when the degradation determining device determines that a fuel cell has degraded, the correction amount changing device increases the amount of correction to the amount of fuel supplied.

According to the present invention thus constituted, the amount of correction to the fuel supply amount is increased when individual fuel cells degrade, therefore since temperature changes relative to degraded individual fuel cells can be greatly restrained, the damage to individual fuel cells associated with temperature changes can be reduced, and fuel cell durability can be maintained.

In the preferred embodiment of the present invention, the correction amount changing device changes the amount of correction to the fuel supply amount in response to the amount of fluctuation in the generating chamber temperature when load following to change the generation output value in accordance with the amount of generation required.

According to the present invention thus constituted, the amount of temperature fluctuation varies depending on individual fuel cell differences when the amount of fuel supplied is changed to follow a load, therefore with respect to the amount of temperature fluctuation caused by these individual differences, the generating chamber temperature can be held within the temperature band and the external environment quickly adapted to by changing the amount of correction.

In the preferred embodiment of the present invention, the solid oxide fuel cell device further comprises a cooling control device for cooling the individual fuel cells in a temperature band in which the generating chamber temperature (T1) is higher than the maximum temperature value (Tb) of the temperature band and lower than the maximum temperature value for anomaly response control.

According to the present invention thus constituted, when the generating chamber temperature is higher than the maximum temperature value (Tb) of the temperature band and lower than the maximum temperature value for anomaly response control, the individual fuel cells are cooled using a cooling control device, therefore even during the period when correction of the fuel supply amount is prohibited, the individual fuel cells are reliably prevented from reaching an anomalous high temperature and, since it is no longer necessary to stop operation, losses due to stopped operation can also be reliably reduced.

Furthermore, the present invention is a solid oxide fuel cell capable of changing generation output value in response to amount of generation required, comprising a plurality of individual solid oxide fuel cells disposed within a generating chamber, means for supplying fuel to the plurality of individual solid oxide fuel cells, means for measuring the temperature of the generating chamber (T1), means for changing at least the amount of fuel supplied by a fuel supply means in response to an amount of generation required based on predetermined control characteristics for supplying fuel, wherein the control means is furnished with a temperature monitoring band, having a minimum temperature value (Ta) and a maximum temperature value (Tb) for adaptive control, predetermined based on a minimum amount and maximum amount of rated electrical generation by the solid oxide fuel cell device, and a maximum temperature value for adaptive control in response to anomalies, which is higher than the maximum temperature value (Tb) of the adaptive control temperature band, as well as a minimum temperature value for adaptive control in response to anomalies, which is lower than the minimum temperature value (Ta) of the adaptive control temperature band, and the control means is furnished with anomaly response control means for executing anomaly response control by restricting operation of the fuel cell when the generating chamber temperature (T1) is higher than the maximum temperature value for anomaly response control or lower than the minimum temperature value for anomaly response control, and with adaptive control means for executing adaptive control by correcting the amount of fuel supplied based on a temperature signal from the temperature measurement means so that the generating chamber temperature (T1) is kept within the temperature band when the generating chamber temperature (T1) exceeds the minimum temperature value (Ta) or maximum temperature (Tb) for adaptive control and goes outside the temperature band.

According to the solid oxide fuel cell device (SOFC) of the present invention, even if individual differences among individual fuel cells or major atmospheric environmental changes or the like occur when load following by changing electrical generation output in response to amount of generation required, they can be absorbed by implementing adaptive control, so that the reaction temperature can be maintained at the optimal temperature band for the generating reaction and expected performance can be achieved, while degradation in individual fuel cell durability can be prevented.

BRIEF DESCRIPTION OF DRAWINGS

FIG. 15 is a flow chart showing a first example of changing the temperature band for monitoring in a solid oxide fuel cell device (SOFC) according to an embodiment of the present invention;

FIG. 16 is a flow chart showing the flow for setting the number of corrections in order to zero-reset the number of corrections to the amount of fuel supplied in a solid oxide fuel cell device (SOFC) according to an embodiment of the present invention;

FIG. 18 is a flow chart showing a third example of changing the temperature band for monitoring in a solid oxide fuel cell device (SOFC) according to an embodiment of the present invention.

DETAILED DESCRIPTION OF THE PREFERRED EMBODIMENTS

Next, referring to the attached drawings, a solid oxide fuel cell device (SOFC) according to an embodiment of the present invention will be explained.

Figure 1:
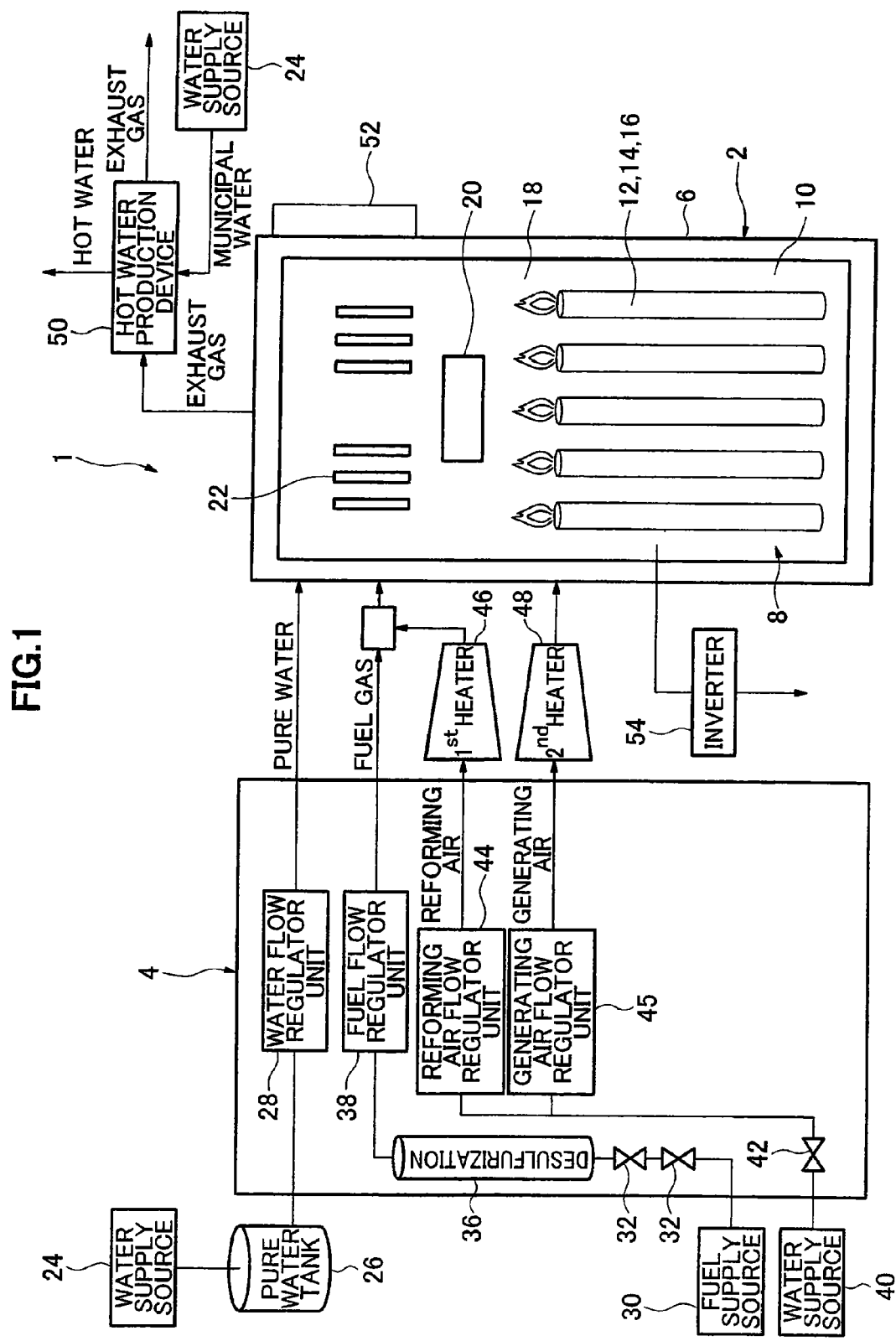
FIG. 1 is an overall schematic showing a solid oxide fuel cell device (SOFC) according to an embodiment of the present invention.

As shown in FIG. 1, a solid oxide fuel cell device (SOFC) according to an embodiment of the present invention is furnished with a fuel cell module 2 and an auxiliary unit 4.

The fuel cell module 2 is furnished with a housing 6; a sealed space 8 is formed within the housing 6, mediated by insulating material (not shown, however the insulating material is not an indispensable structure and may be omitted). Note that it is acceptable to provide no insulating material. A fuel cell assembly 12 for carrying out the power generating reaction between fuel gas and oxidant (air) is disposed in the power generating chamber 10 at the lower portion of this sealed space 8. This fuel cell assembly 12 is furnished with ten fuel cell stacks 14 (see FIG. 5), and the fuel cell stack 14 comprises 16 fuel cell units 16 (see FIG. 4). Thus, the fuel cell assembly 12 has 160 fuel cell units 16, all of which are serially connected.

A combustion chamber 18 is formed above the aforementioned power generating chamber 10 in the sealed space 8 of the fuel cell module 2. Residual fuel gas and residual oxidant (air) not used in the power generation reaction is combusted in this combustion chamber 18 to produce exhaust gas.

A reformer 20 for reforming fuel gas is disposed at the top of the combustion chamber 18; the reformer 20 is heated by the heat of residual gas combustion to a temperature at which the reforming reaction can take place. An air heat exchanger 22 for receiving the heat of combustion and heating the air is further disposed above this reformer 20.

Next, the auxiliary unit 4 is furnished with a pure water tank 26 for holding water from a municipal or other water supply source 24 and filtering it into pure water, and a water flow rate regulator unit 28 (a "water pump" or the like driven by a motor) for regulating the flow rate (litter per minute) of water supplied from the reservoir tank. The auxiliary unit 4 is further furnished with a gas shutoff valve 32 for shutting off the fuel gas supply from a fuel supply source 30 such as municipal gas or the like, a desulfurizer 36 for desulfurizing the fuel gas, and a fuel gas flow rate regulator unit 38 (a "fuel pump" or the like driven by a motor) for regulating the flow rate (litter per minute) of fuel gas. Furthermore, an auxiliary unit 4 is furnished with an electromagnetic valve 42 for shutting off air serving as an oxidant and supplied from an air supply source 40, and a reforming air flow rate regulator unit 44 and generating air flow rate regulator unit 45 ("air blower" or the like driven by a motor) for regulating air flow rate (litter per minute).

Note that in the SOFC according to the embodiment of the present invention, there is no heating means such as a heater for heating the reforming air supply to the reformer 20 or the power generating air supply to the power generating chamber 10 in order to efficiently raise the temperature at startup, nor is there a heating means for separately heating the reformer 20.

Next, a hot-water producing device 50 supplied with exhaust gas is connected to the fuel cell module 2. Municipal water from a water supply source 24 is supplied to this hot-water producing device 50; this water is turned into hot water by the heat of the exhaust gas, and is supplied to a hot water reservoir tank in an external water heater (not shown).

The fuel cell module 2 is provided with a control box 52 for controlling the supply flow rates of fuel gas and the like.

Furthermore, an inverter 54 serving as an electrical power extraction unit (electrical power conversion unit) for supplying electrical power generated by the fuel cell module to the outside is connected to the fuel cell module 2.

Figure 2:
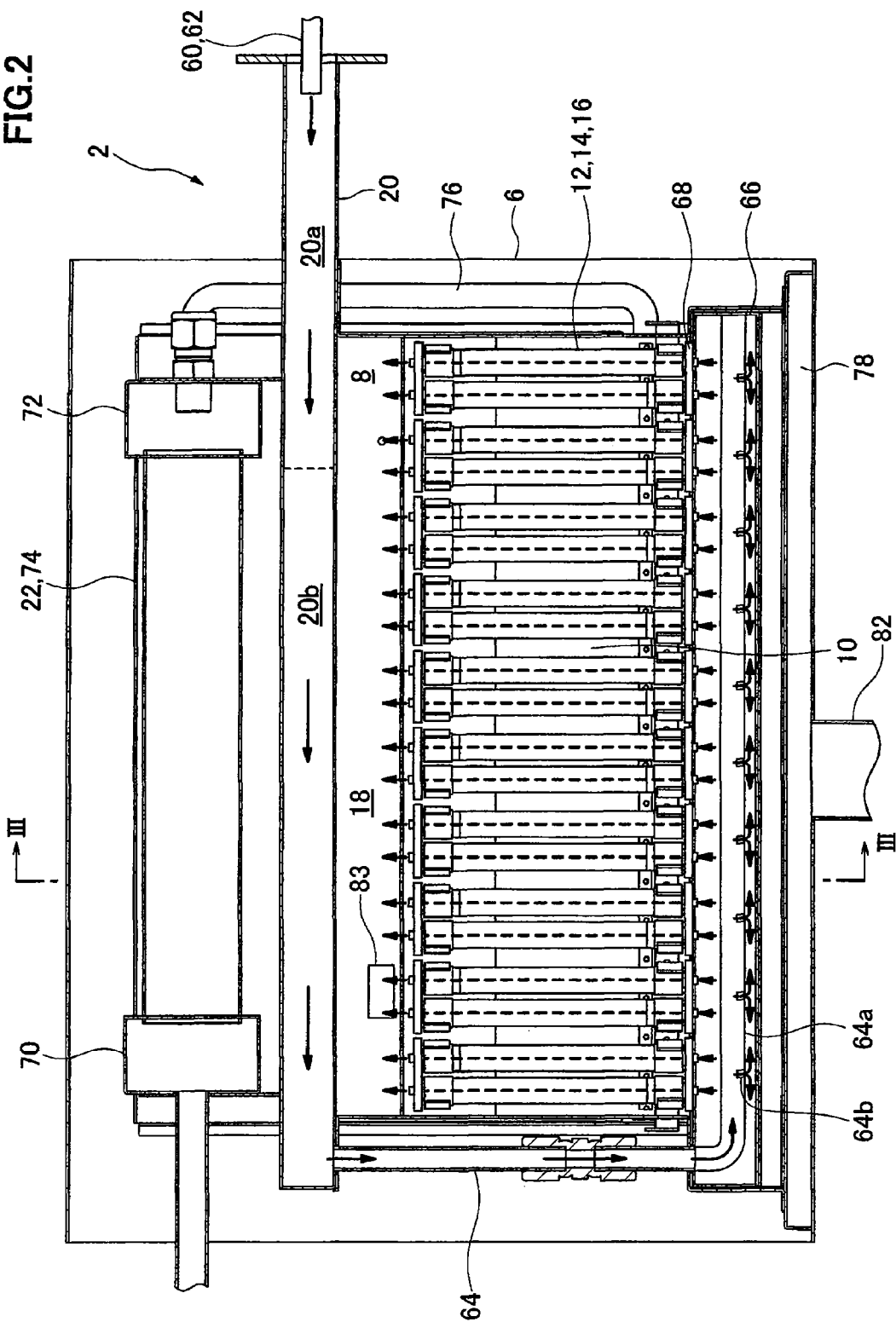
FIG. 2 is a front elevation sectional view showing a solid oxide fuel cell device (SOFC) fuel cell module according to an embodiment of the present invention.
Figure 3:
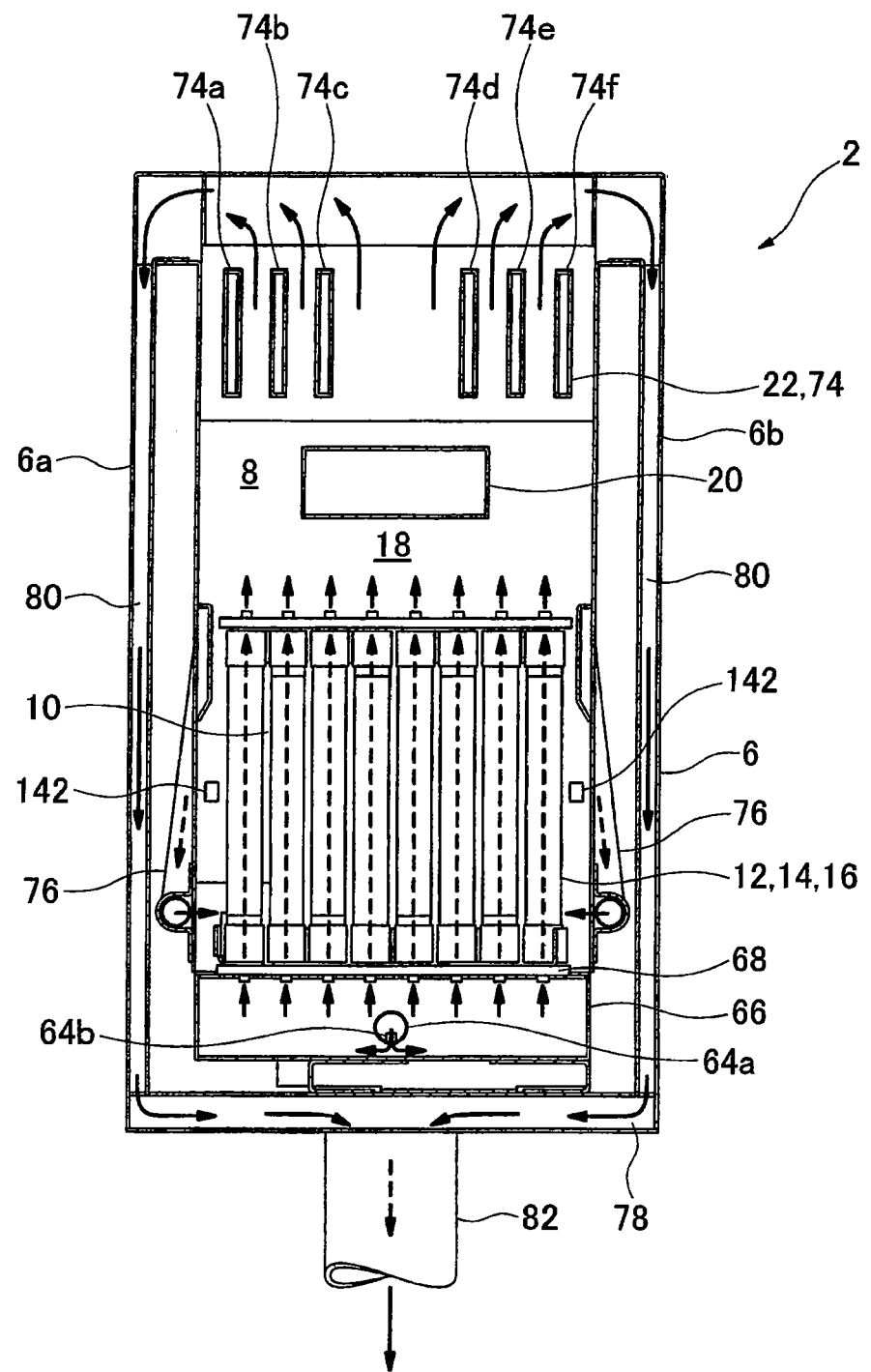
FIG. 3 is a sectional diagram along line in FIG. 2.

The internal structure of the solid oxide fuel cell device (SOFC) according to the embodiment of the present invention is explained using FIGS. 2 and 3.

As shown in FIGS. 2 and 3, a fuel cell assembly 12, a reformer 20, and an air heat exchanger 22 are arranged in sequence starting from the bottom in the sealed space 8 within the fuel cell module 2 housing 6, as described above.

A pure water guide pipe 60 for introducing pure water on the upstream end of the reformer 20, and a reform gas guide pipe 62 for introducing the fuel gas and reforming air to be reformed, are attached to the reformer 20; a vaporizing section 20a and a reforming section 20b are formed in sequence starting from the upstream side within the reformer 20, and the reforming section 20b is filled with a reforming catalyst.

Fuel gas and air blended with the steam (pure water) introduced into the reformer 20 is reformed by the reforming catalyst used to fill in the reformer 20. Appropriate reforming catalysts are used, such as those in which nickel is imparted to the surface of alumina spheres, or ruthenium is imparted to alumina spheres.

A fuel gas supply line 64 is connected to the downstream end of the reformer 20; this fuel gas supply line 64 extends downward, then further extends horizontally within a manifold formed under the fuel cell assembly 12. Multiple fuel supply holes 64b are formed on the bottom surface of a horizontal portion 64a of the fuel gas supply line 64; reformed fuel gas is supplied into the manifold 66 from these fuel supply holes 64b.

A lower support plate 68 provided with through holes for supporting the above-described fuel cell stack 14 is attached at the top of the manifold 66, and fuel gas in the manifold 66 is supplied into the fuel cell unit 16.

An air heat exchanger 22 is provided over the reformer 20. The air heat exchanger 22 is furnished with an air concentration chamber 70 on the upstream side and two air distribution chambers 72 on the downstream side; the air concentration chamber 70 and the distribution chambers 72 are connected using six air flow conduits 74. Here, as shown in FIG. 3, three air flow conduits 74 form a set (74a, 74b, 74c, 74d, 74e, 74f); air in the air concentration chamber 70 flows from each set of the air flow conduits 74 to the respective air distribution chambers 72.

Air flowing in the six air flow conduits 74 of the air heat exchanger 22 is pre-heated by rising combustion exhaust gas from the combustion chamber 18.

Air guide pipes 76 are connected to each of the respective air distribution chambers 72; these air guide pipes 76 extend downward, communicating at the bottom end side with the lower space in the generating chamber 10, and introducing preheated air into the generating chamber 10.

Next, an exhaust gas chamber 78 is formed below the manifold 66. As shown in FIG. 3, an exhaust gas conduit 80 extending in the vertical direction is formed on the insides of the front surface 6a and the rear surface 6b which form the faces in the longitudinal direction of the housing 6; the top inside of the exhaust gas conduit 80 communicates with the space in which the air heat exchanger to rule 22 is disposed, and the bottom end side communicates with the exhaust gas chamber 78. An exhaust gas discharge pipe 82 is connected at approximately the center of the bottom surface of the exhaust gas chamber 78; the downstream end of the exhaust gas discharge pipe 82 is connected to the above-described hot water producing device 50 shown in FIG. 1.

As shown in FIG. 2, an ignition device 83 for starting the combustion of fuel gas and air is disposed on the combustion chamber 18. No heating means such as a burner or the like for separately heating the combustion chamber 18 or the fuel cell unit 16 to support ignition at startup or prevent flameout or blow out is provided on the combustion chamber 18.

Figure 4:
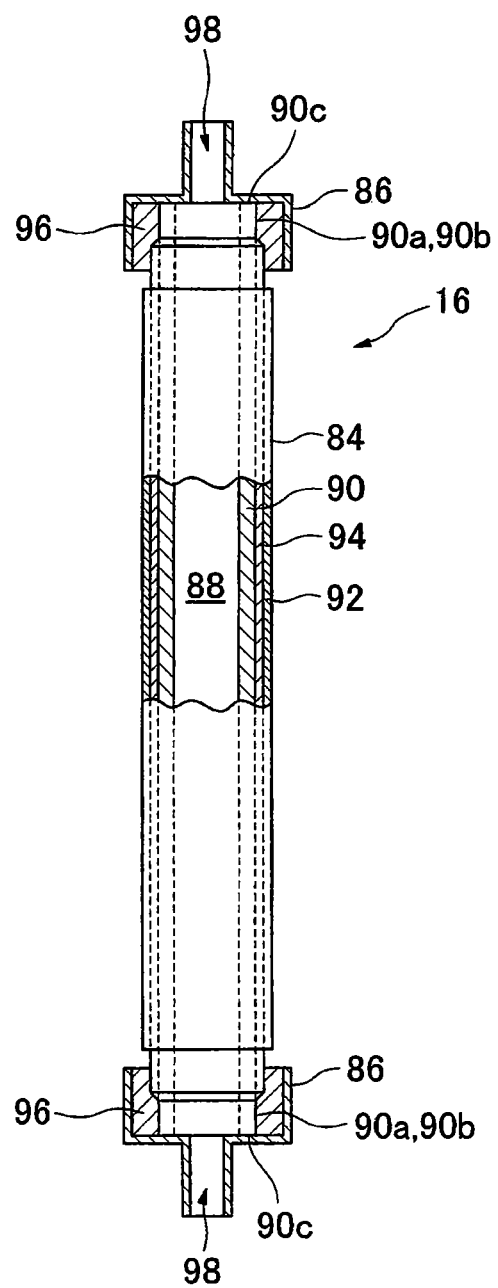
FIG. 4 is a partial section showing a solid oxide fuel cell device (SOFC) fuel cell unit according to an embodiment of the present invention.

Next, referring to FIG. 4, the fuel cell unit 16 will be explained. As shown in FIG. 4, the fuel cell unit 16 is furnished with a fuel cell 84 and internal electrode terminals 86, respectively connected to the respective terminals at the top and bottom of the fuel cell 84.

The fuel cell 84 is a tubular structure extending in the vertical direction, furnished with a cylindrical internal electrode layer 90, on the inside of which is formed a fuel gas flow path 88, a cylindrical external electrode layer 92, and an electrolyte layer 94 between the internal electrode layer 90 and the external electrode layer 92. The internal electrode layer 90 is a fuel electrode through which fuel gas passes, and is a (−) pole, while the external electrode layer 92 is an air electrode for contacting the air, and is a (+) pole.

The internal electrode terminals 86 attached at the top and bottom ends of the fuel cell unit 16 have the same structure, therefore the internal electrode terminal 86 attached at the top end side will be specifically explained. The top portion 90a of the inside electrode layer 90 is furnished with an outside perimeter surface 90b and top end surface 90c, exposed to the electrolyte layer 94 and the outside electrode layer 92. The inside electrode terminal 86 is connected to the outer perimeter surface 90b of the inside electrode layer 90 through a conductive seal material 96, and is electrically connected to the inside electrode layer 90 by making direct contact with the top end surface 90c of the inside electrode layer 90. A fuel gas flow path 98 communicating with fuel gas flow path 88 in the inside electrode layer 90 is formed at the center portion of the inside electrode terminal 86.

The inside electrode layer 90 is formed, for example, from at least one of a mixture of Ni and zirconia doped with at least one type of rare earth element selected from among Ca, Y, Sc, or the like; or a mixture of Ni and ceria doped with at least one type of rare earth element; or any mixture of Ni with lanthanum gallate doped with at least one element selected from among Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

The outside electrode layer 92 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; Ag, or the like.

Figure 5:
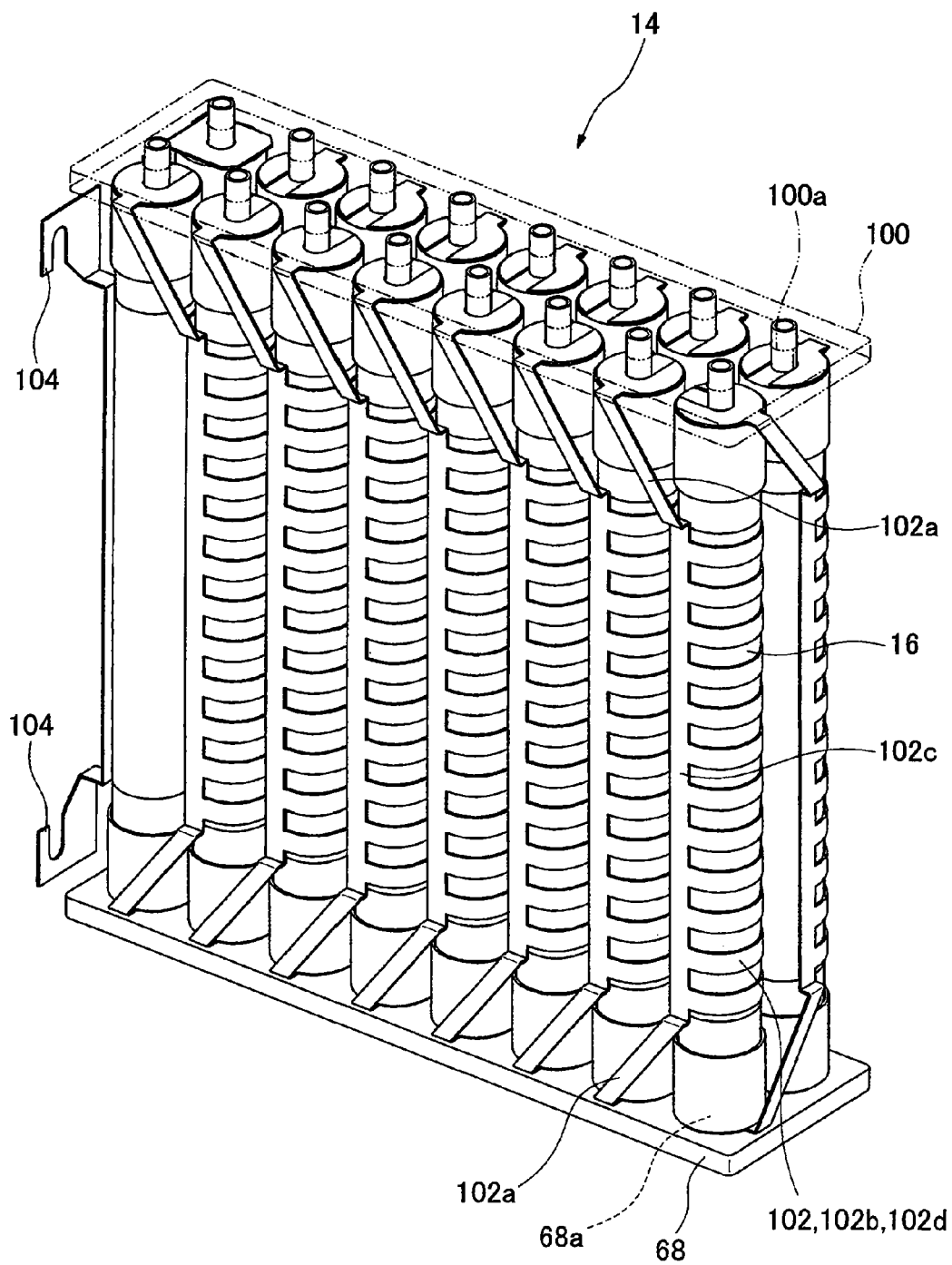
FIG. 5 is a perspective view showing a solid oxide fuel cell device (SOFC) fuel cell stack according to an embodiment of the present invention.

Next, referring to FIG. 5, the fuel cell stack 14 will be explained. As shown in FIG. 5, the fuel cell stack 14 is furnished with sixteen fuel cell units 16; the top sides and bottom sides of these fuel cell units 16 are respectively supported by a lower support plate 68 and upper support plate 100. Through holes 68a and 100a, through which the inside electrode terminal 86 can penetrate, are provided on the lower support plate 68 and upper support plate 100.

In addition, a current collector 102 and an external terminal 104 are attached to the fuel cell unit 16. The current collector 102 is integrally formed by a fuel electrode connecting portion 102a, which is electrically connected to the inside electrode terminal 86 attached to the inside electrode layer 90 serving as the fuel electrode, and by an air electrode connecting portion 102b, which is electrically connected to the entire external perimeter of the outside electrode layer 92 serving as the air electrode. The air electrode connecting portion 102b is formed of a vertical portion 102c extending vertically along the surface of the outside electrode layer 92, and multiple horizontal portions 102d extending in the horizontal direction from the vertical portion 102c along the surface of the outside electrode layer 92. The fuel electrode connecting portion 102a extends linearly in an upward or downward diagonal direction from the vertical portion 102c of the air electrode connecting portion 102b toward the inside electrode terminals 86 positioned in the upper and lower directions on the fuel cell unit 16.

Furthermore, inside electrode terminals 86 at the top and bottom ends of the two fuel cell units 16 positioned at the end of the fuel cell stack 14 (at the front and back sides on the left edge in FIG. 5) are respectively connected to the external terminals 104. These external terminals 104 are connected to the external terminals 104 (not shown) at the ends of the adjacent fuel cell stack 14, and as described above, all of the 160 fuel cell units 16 are connected in series.

Next, referring to FIG. 6, the sensors attached to the solid oxide fuel cell device (SOFC) according to the embodiment of the present invention will be explained.

Figure 6:
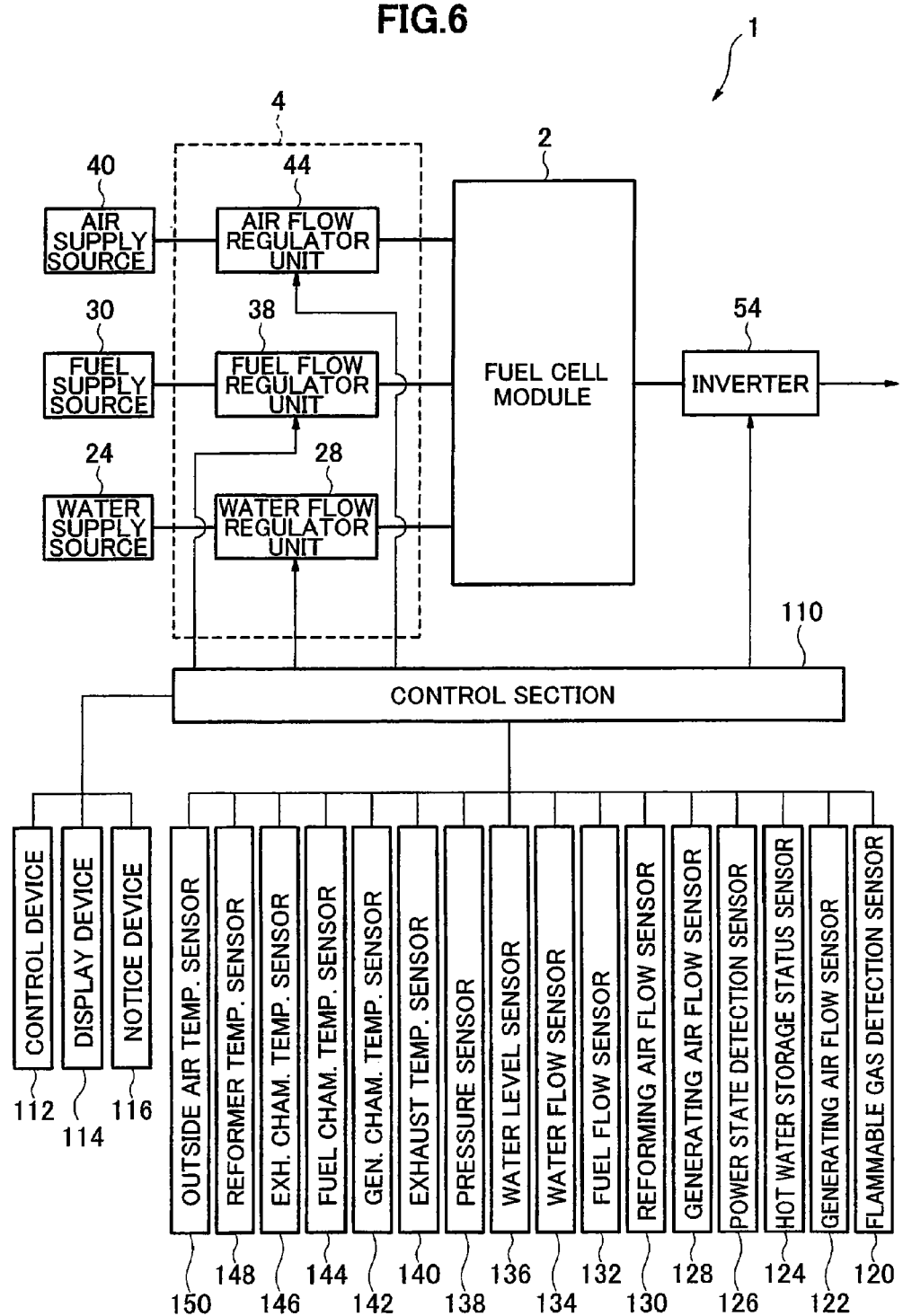
FIG. 6 is a block diagram showing a solid oxide fuel cell device (SOFC) according to an embodiment of the present invention.

As shown in FIG. 6, a solid oxide fuel cell device 1 is furnished with a control unit 110, an operating device 112 provided with operating buttons such as "ON" or "OFF" for user operation, a display device 114 for displaying various data such as a generator output value (Watts), and a notification device 116 for issuing warnings during abnormal states and the like are connected to the control unit 110. The notification device 116 may be connected to a remote control center to inform the control center of abnormal states.

Next, signals from the various sensors described below are input to the control unit 110.

First, a flammable gas detection sensor 120 detects gas leaks and is attached to the fuel cell module 2 and the auxiliary unit 4.

The purpose of the flammable gas detection sensor 120 is to detect leakage of CO in the exhaust gas, which is meant to be exhausted to the outside via the exhaust gas conduit 80 and the like, into the external housing (not shown) which covers the fuel cell module 2 and the auxiliary unit 4.

A water reservoir state detection sensor 124 detects the temperature and amount of hot water in a water heater (not shown).

An electrical power state detection sensor 126 detects current, voltage, and the like in the inverter 54 and in a distribution panel (not shown).

A power generating air flow rate detection sensor 128 detects the flow rate of power generating air supplied to the generating chamber 10.

A reforming air flow rate sensor 130 detects the flow rate of reforming air supplied to the reformer 20.

A fuel flow rate sensor 132 detects the flow rate of fuel gas supplied to the reformer 20.

A water flow rate sensor 134 detects the flow rate of pure water (steam) supplied to the reformer 20.

A water level sensor 136 detects the water level in pure water tank 26.

A pressure sensor 138 detects pressure on the upstream side outside the reformer 20.

An exhaust temperature sensor 140 detects the temperature of exhaust gas flowing into the hot water producing device 50.

As shown in FIG. 3, a generating chamber temperature sensor 142 is disposed on the front surface side and rear surface side around the fuel cell assembly 12, and detects the temperature around the fuel cell stack 14 in order to estimate the temperature of the fuel cell stack 14 (i.e., of the fuel cell 84 itself).

A combustion chamber temperature sensor 144 detects the temperature in combustion chamber 18.

An exhaust gas chamber temperature sensor 146 detects the temperature of exhaust gases in the exhaust gas chamber 78.

A reformer temperature sensor 148 detects the temperature of the reformer 20 and calculates the reformer 20 temperature from the intake and exit temperatures on the reformer 20.

If the solid oxide fuel cell device (SOFC) is placed outdoors, the outside temperature sensor 150 detects the temperature of the outside atmosphere. Sensors to detect outside atmospheric humidity and the like may also be provided.

Signals from these various sensors are sent to the control unit 110; the control unit 110 sends control signals to the water flow rate regulator unit 28, the fuel flow rate regulator unit 38, the reforming air flow rate regulator unit 44, and the power generating air flow rate regulator unit 45 based on data from the sensors, and controls the flow rates in each of these units.

The control unit 110 sends control signals to the inverter 54 to control the supplied electrical power.

Figure 7:
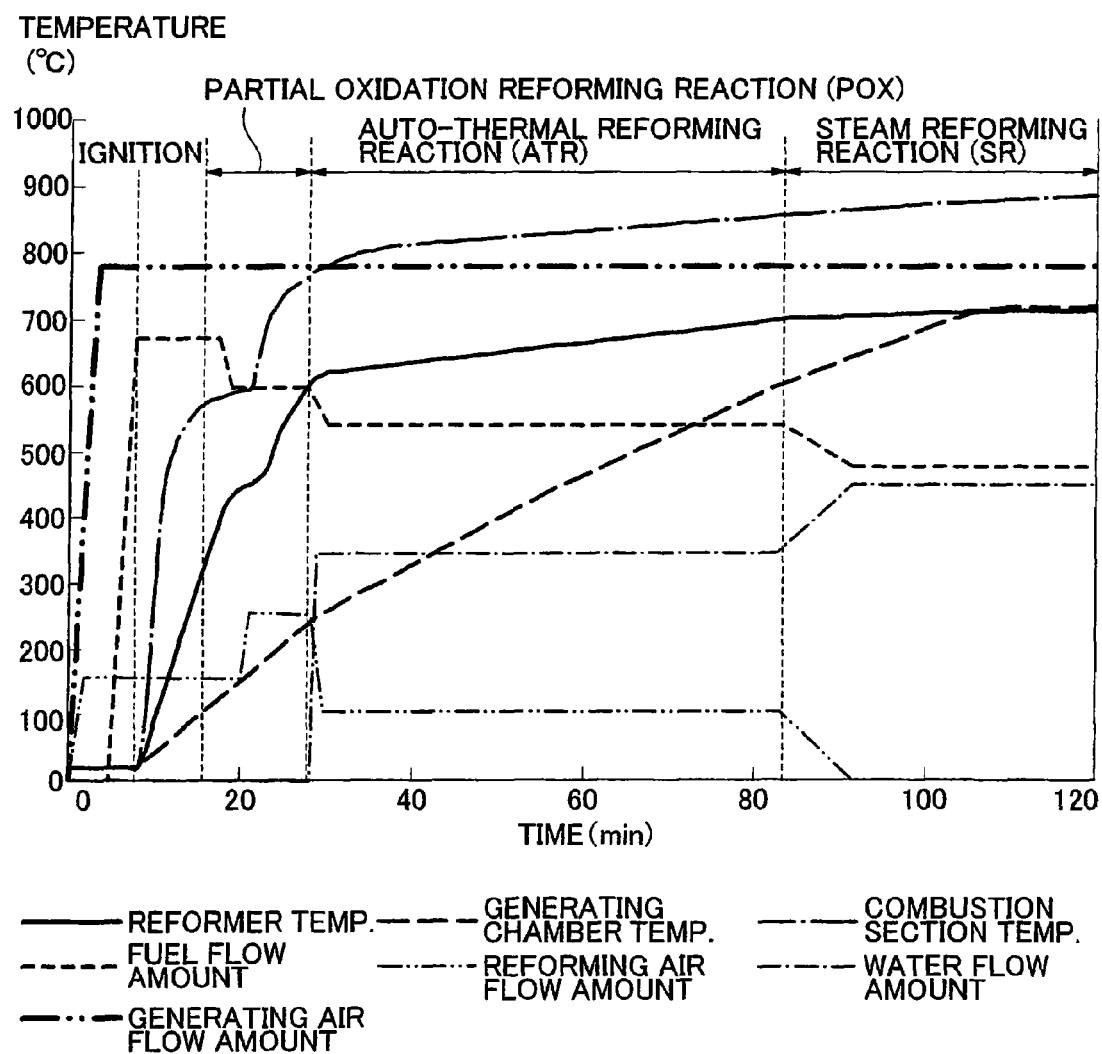
FIG. 7 is a timing chart showing the operation at the time of startup of a solid oxide fuel cell device (SOFC) according to an embodiment of the present invention.

Next, referring to FIG. 7, the operation of a solid oxide fuel cell device (SOFC) according to the present embodiment at the time of startup will be explained.

In order to warm up the fuel cell module 2, the operation starts in a no-load state, i.e., with the circuit which includes the fuel cell module 2 in an open state. At this point current does not flow in the circuit, therefore the fuel cell module 2 does not generate electricity.

First, reforming air is supplied from the reforming air flow rate regulator unit 44 to the reformer 20 on the fuel cell module 2. At the same time, power generating air is supplied from the generating air flow rate regulator unit 45 to an air heat exchanger 22 of the fuel cell module 2, and the power generating air reaches the generating chamber 10 and the combustion chamber 18.

Immediately thereafter, fuel gas is also supplied from the fuel flow rate regulator unit 38, and fuel gas into which reforming air is blended passes through the reformer 20, the fuel cell stack 14, and the fuel cell unit 16 to reach the combustion chamber 18.

Next, ignition is brought about by the ignition device 83, and fuel gas and air (reforming air and power generating air) supplied to the combustion chamber 18 is combusted. This combustion of fuel gas and air produces exhaust gas; the generating chamber 10 is warmed by the exhaust gas, and when the exhaust gas rises into the fuel cell module 2 sealed space 8, the fuel gas, which includes the reforming air in the reformer 20 is warm, as is the power generating air inside the air heat exchanger 22.

At this point, fuel gas into which the reforming air is blended is supplied to the reformer 20 by the fuel flow rate regulator unit 38 and the reforming air flow rate regulator unit 44, therefore the partial oxidation reforming reaction PDX given by Expression (1) proceeds in the reformer 20. This partial oxidation reforming reaction PDX is an exothermic reaction, and therefore has favorable starting characteristics. The fuel gas whose temperature has risen is supplied from the fuel gas supply line 64 to the bottom of the fuel cell stack 14, and by this means the fuel cell stack 14 is heated from the bottom, and the temperature of the combustion chamber 18 has risen by the combustion of the fuel gas and air, and the fuel cell stack 14 is therefore heated from the upper side such that the temperature of the fuel cell stack 14 can be raised in an essentially uniform manner in the vertical direction. Even though the partial oxidation reforming reaction PDX is progressing, the ongoing combustion reaction between fuel gas and air is continued in the combustion chamber 18.

(1)

When the reformer temperature sensor 148 detects that the reformer 20 has reached a predetermined temperature (e.g. 600° C.) after the start of the partial oxidation reforming reaction PDX, a pre-blended gas of fuel gas, reforming air, and steam is applied to the reformer 20 by the water flow rate regulator unit 28, the fuel flow rate regulator unit 38, and the reforming air flow rate regulator unit 44. At this point an auto-thermal reforming reaction ATR, which makes use of both the aforementioned partial oxidation reforming reaction PDX and the steam reforming reaction SR described below, proceeds in the reformer 20. This auto-thermal reforming reaction ATR can be internally thermally balanced, therefore the reaction proceeds in a thermally independent fashion inside the reformer 20. In other words, when there is a large amount of oxygen (air), heat emission by the partial oxidation reforming reaction PDX dominates, and when there is a large amount of steam, the endothermic steam reforming reaction SR dominates. At this stage, the initial stage of startup has passed and some degree of elevated temperature has been achieved within the generating chamber 10, therefore even if the endothermic reaction is dominant, there will be no major drop in temperature. Also, the combustion reaction continues within the combustion chamber 18 even as the auto-thermal reforming reaction ATR proceeds.

When the reformer temperature sensor 146 detects that the reformer 20 has reached a predetermined temperature (e.g., 700° C.) following the start of the auto-thermal reforming reaction ATR shown as Expression (2), the supply of reforming air by the reforming air flow rate regulator unit 44 is stopped, and the supply of steam by the water flow rate regulator unit 28 is increased. By this means, a gas containing no air and only containing fuel gas and steam is supplied to the reformer 20, where the steam reforming reaction SR of Expression (3) proceeds.

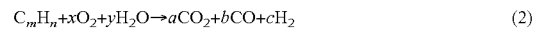

(2)

(3)

This steam reforming reaction SR is an endothermic reaction, therefore the reaction proceeds as a thermal balance is maintained with the heat of combustion from the combustion chamber 18. At this stage, the fuel cell module 2 is in the final stages of startup, therefore the temperature has risen to a sufficiently high level within the generating chamber 10 so that no major temperature drop is induced in the power generating chamber 10 even though an endothermic reaction is proceeding. Also, the combustion reaction continues to proceed in the combustion chamber 18 even as the steam reforming reaction SR is proceeding.

Thus, after the fuel cell module 2 has been ignited by the ignition device 83, the temperature inside the generating chamber 10 gradually rises as a result of the partial oxidation reforming reaction PDX, the auto-thermal reforming reaction ATR, and the steam reforming reaction SR which proceed in that sequence. Next, when the temperature inside the generating chamber 10 and the temperature of the fuel cell 84 reach a predetermined generating temperature which is lower than the rated temperature at which the cell module 2 can be stably operated, the circuit which includes the fuel cell module 2 is closed, power generation by the fuel cell module 2 begins, and current then flows to the circuit. Generation of electricity by the fuel cell module 2 causes the fuel cell 84 to emit heat, such that the temperature of the fuel cell 84 rises. As a result, the rated temperature at which the fuel cell module 2 is operated becomes, for example, 600° C.-800° C.

Following this, fuel gas and air having respective flow rates greater than those consumed by the fuel cell 84 is applied in order to maintain the rated temperature and continue combustion inside the combustion chamber 18. Generation of electricity by the high reform-efficiency steam reforming reaction SR proceeds while electricity is being generated.

Next, referring to FIG. 8, the operation upon stopping the solid oxide fuel cell device (SOFC) according to the embodiment of the present invention will be explained.

Figure 8:
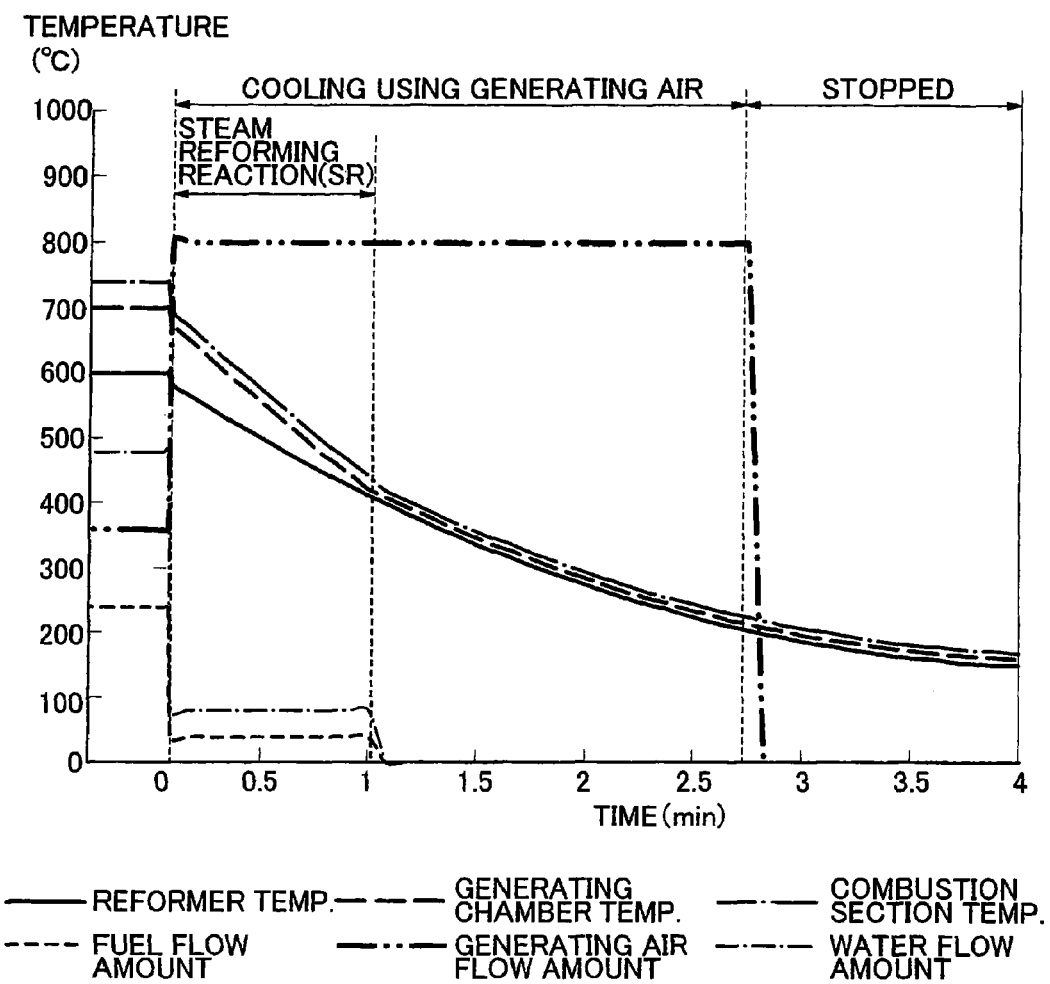
FIG. 8 is a timing chart showing the operation at the time of shutdown of a solid oxide fuel cell device (SOFC) according to an embodiment of the present invention.

As shown in FIG. 8, when stopping the operation of the fuel cell module 2, the fuel flow rate regulator unit 38 and the water flow rate regulator unit 28 are first operated to reduce the flow rates of fuel gas and steam being supplied to the reformer 20.

When stopping the operation of the fuel cell module 2, the flow rate of power generating air supplied by the power generating air flow rate regulator unit 45 into the fuel cell module 2 is being increased at the same time that the flow rates of fuel gas and steam being supplied to the reformer 20 is being reduced; the fuel cell assembly 12 and the reformer 20 are air cooled to reduce their temperature. Thereafter, when the temperature of the generating chamber reaches a predetermined temperature, e.g. 400° C., supply of the fuel gas and steam to the reformer 20 is stopped, and the steam reforming reaction SR in the reformer 20 ends. Supply of the power generating air continues until the temperature in the reformer 20 reaches a predetermined temperature, e.g. 200° C.; when the predetermined temperature is reached, the supply of power generating air from the power generating air flow rate regulator unit 45 is stopped.

Thus in the embodiment of the present invention, the steam reforming reaction SR by the reformer 20 and cooling by power generating air are used in combination, therefore when the operation of the fuel cell module 2 is stopped, that operation can be stopped relatively quickly.

Next, referring to FIGS. 9 through 11, operational state when load following by changing the generation output value in response to the amount of generation required of a solid oxide fuel cell device (SOFC) according to an embodiment of the present invention will be explained.

Figure 9:
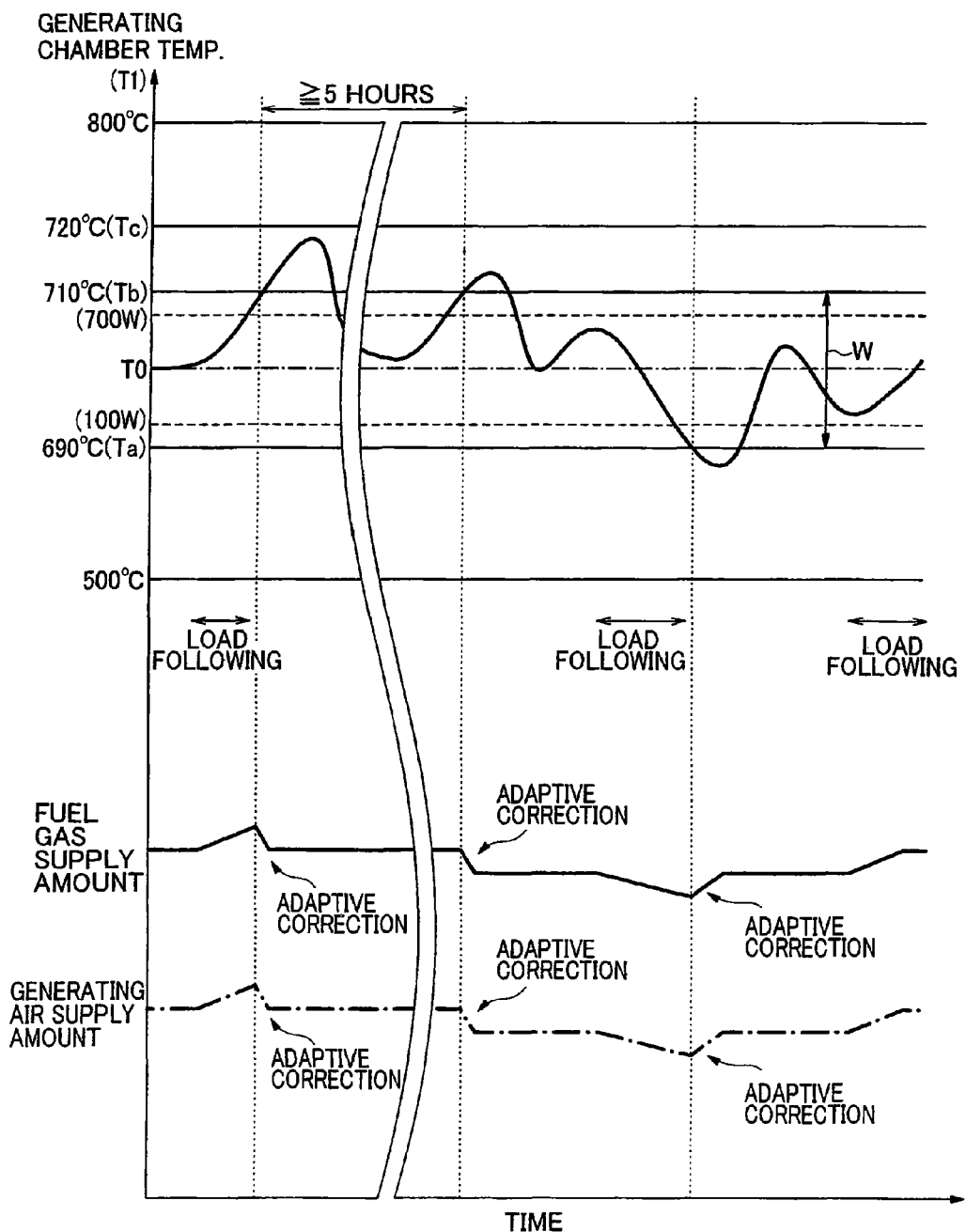
FIG. 9 is a timing chart showing the operational state when load following, in which the generation output value is changed in response to the amount of generation required of a solid oxide fuel cell device (SOFC) according to an embodiment of the present invention.

FIG. 9 is a timing chart showing the operational state when load following, in which the generation output value is changed in response to the amount of generation required of a solid oxide fuel cell device (SOFC) according to an embodiment of the present invention; FIG. 10 is a diagram showing fuel supply control characteristics (the relationship between target generation amount and amount of fuel gas supplied) in a solid oxide fuel cell device (SOFC) according to an embodiment of the present invention; FIG. 11 is a diagram showing fuel supply control characteristics (the relationship between target generation amount and amount of generating air supplied) in a solid oxide fuel cell device (SOFC) according to an embodiment of the present invention.

First, in FIG. 9, the vertical axis indicates the generating chamber temperature (T1), fuel gas supply amount, and generating air supply amount; the horizontal axis indicates time (t).

The solid oxide fuel cell device (SOFC) 1 according to the present embodiment is a fuel cell with a rated generation amount of 100 W-700 W; in this range it is capable of load following by changing the generation output value in response to the amount of generation required.

Next, when generating a rated generation output value of 100 W-700 W the individual fuel cells 84 must be kept in a temperature band favorable to the generating reaction; this temperature band is responsive to the 100 W-700 W rated generation output value under conditions in which the standard individual fuel cells at the time of design without individual differences are operated in a predetermined reference operating state.

Next, the minimum temperature value (Ta), which is a temperature lower by a predetermined temperature than the temperature of the individual fuel cells 84 corresponding to a minimum rated generation amount of 100 W, is set to 690° C., and the maximum temperature value (Tb), which is a temperature higher by a predetermined temperature than the temperature of the individual fuel cells 84 corresponding to a maximum rated generation amount of 700 W, is set to 710° C.; the temperature range defined by this minimum temperature value (Ta) and maximum temperature value (Tb) is referred to as the monitoring temperature band W. Note that the temperature of the individual fuel cells 84 corresponding to the minimum rated generation amount of 100 W is deemed to be the minimum temperature value, and the temperature of the individual fuel cells 84 corresponding to the maximum rated generation amount of 700 W is deemed to be the maximum temperature value; this minimum temperature value and maximum temperature value may also be used as the monitoring temperature band W.

Thus the minimum temperature value and maximum temperature value are determined in light of the minimum rated generation amount and maximum rated generation amount, and as is described below, the amount of fuel gas and generating air supplied is corrected when the generating chamber temperature goes outside the monitoring temperature band W with these minimum and maximum temperature values, therefore when load following by changing the amount of fuel supplied in accordance with the amount of generation required, it is not necessary to implement complex controls such as changing the fuel supply control characteristics, and a simple and sufficient control becomes possible.

Also, in the present invention it is acceptable to perform rated operation when the solid oxide fuel cell device (SOFC) is installed and then, using the generating chamber temperature of the individual fuel cells at this point as the rated reference temperature (T0), to set the minimum temperature value and maximum temperature value 10° C. above and below this rated reference temperature. By so doing, the differences between individual fuel cells 84 can be absorbed at the initial stage of operation.

Figure 10:
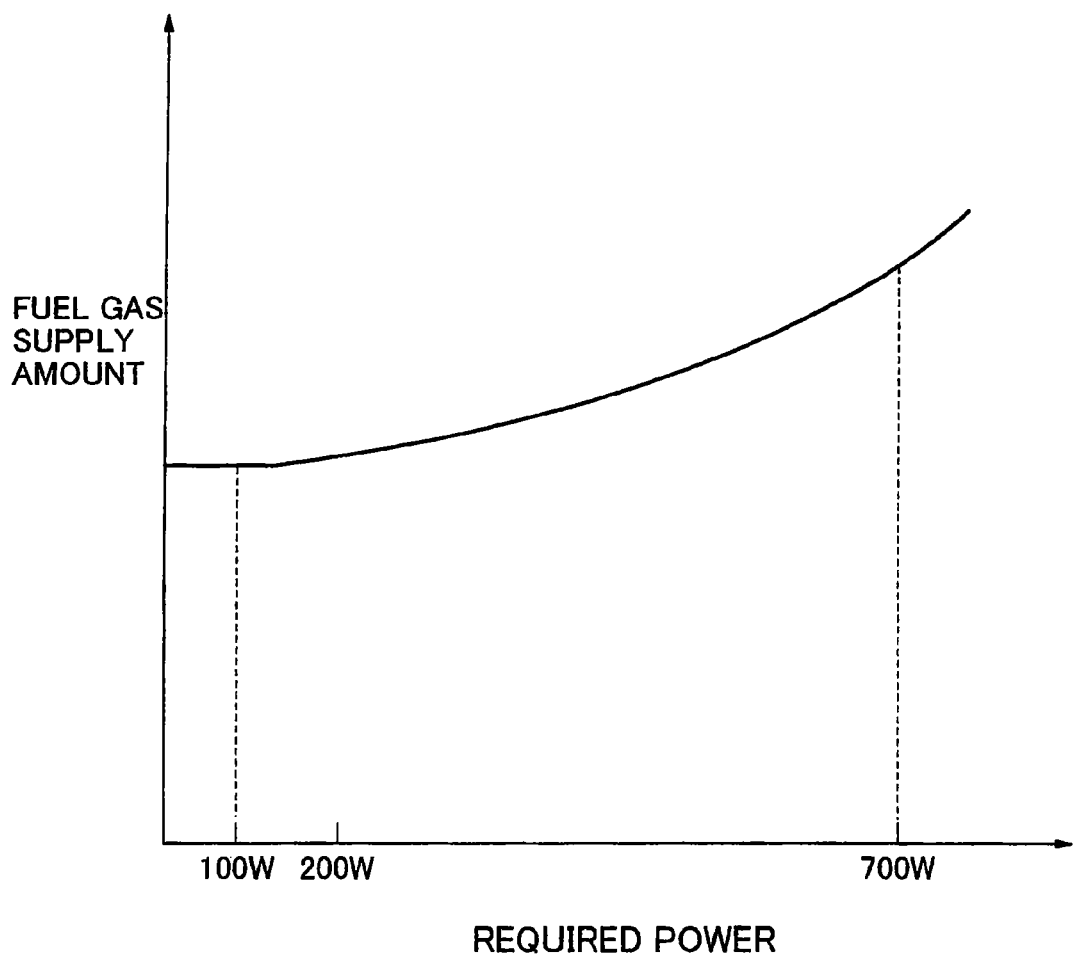
FIG. 10 is a diagram showing fuel supply control characteristics (the relationship between target generation amount and amount of fuel gas supplied) in a solid oxide fuel cell device (SOFC) according to an embodiment of the present invention.
Figure 11:
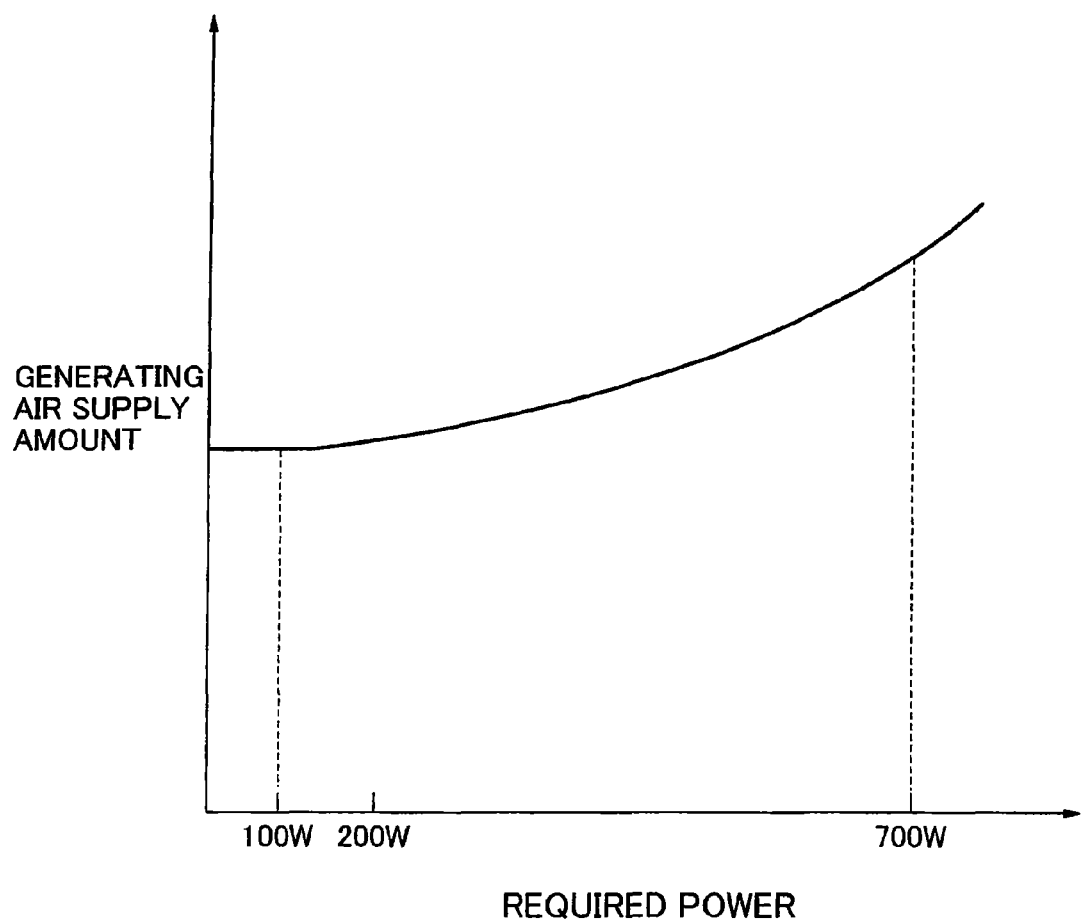
FIG. 11 is a diagram showing fuel supply control characteristics (the relationship between target generation amount and amount of generating air supplied) in a solid oxide fuel cell device (SOFC) according to an embodiment of the present invention.

Next, in the present embodiment, as shown in FIG. 10, the "relationship between required generation amount and fuel gas supply amount," which is a fuel supply control characteristic, is predetermined; as shown in FIG. 11, the "relationship between amount of generation required and generating air supply amount," which is a fuel supply control characteristic, is also predetermined.

In the present embodiment, when load following by changing the generation output value in response to the amount of generation required is carried out after the fuel cell module 2 transitions to normal operation, the amount of fuel gas and generating air supplied are increased or decreased based on the fuel supply control characteristics shown in FIGS. 10 and 11 to enable following of the required load.

During such load following, the temperature (T1) of the individual fuel cells 84 in the fuel cell module 2 may go outside of the monitoring temperature band W due to differences between individual fuel cells 84, or the atmospheric environment (temperature, humidity, etc.) where the fuel cell module 2 is installed. For this reason, in the present embodiment when the individual fuel cell 84 generating chamber temperature (T1) goes below the minimum temperature value (Ta), an increasing correction is made to raise the respective amounts of fuel gas and generating air by a predetermined amount (10% of the supply amount in the fuel supply control characteristics) and, when the individual fuel cell 84 generating chamber temperature (T1) exceeds the maximum temperature value (Tb), a reducing correction is made to reduce the respective amounts of fuel gas and generating air by a predetermined amount (10% of the supply amount in the fuel supply control characteristics), thereby executing adaptive control so that the individual fuel cells 84 generating chamber temperature (T1) comes within the monitoring temperature band W.

In the present embodiment, the next correction iteration is not executed after correcting to increase or decrease the supply amounts of fuel gas and generating air during load following by adaptive control until a predetermined prohibition period (e.g. 5 hours) has elapsed. By so doing, because no correction of the supply amounts of fuel gas and generating air is executed during the period when the individual fuel cell 84 temperature is stabilizing (in an SOFC this generally requires several hours), negative effects on the individual fuel cells 84 from over-correction are prevented, and the effects on fuel supply control characteristics arising from differences between individual fuel cell 84 or outside environmental changes can be adapted to.

In the present embodiment the above-described increasing corrections can be executed up to three times (number of correction iterations +3) in this adaptive control, and decreasing corrections can be executed up to 5 times (number of correction iterations −5); there is a limitation on the number of iterations above that. If, in such instances, a decreasing correction is made after an increasing correction, the respective correction iterations cancel one another out. Therefore when a predetermined number of iterations (for increasing correction, +3; for decreasing correction, −5) is reached after the number of increasing corrections (number of iterations on the + side) and the number of decreasing corrections (number of iterations on the − side) cancel one another out, a limitation (restriction) is set in place to correct the amount of fuel gas and generating air supplied in the same direction thereafter.

Here the change in the generating chamber temperature (T1) of the individual fuel cells due to correction of the amount of fuel gas and generating air supplied occurs several hours later (e.g. 5 hours), but in the adaptive control of the present embodiment, a limitation (restriction) is set in place to correct the amount of fuel gas and generating air supplied in the same direction thereafter when a predetermined number of iterations (for increasing correction, +3; for decreasing correction, −5) is reached after the number of increasing corrections (number of iterations on the + side) and the number of decreasing corrections (number of iterations on the − side) cancel one another out, therefore excessive fuel correction by adaptive control can be avoided, as can such things as excessively burdening the individual fuel cells 84 due to overcorrection of the fuel supply amount during anomalies or the like, for example.

In the adaptive control of the present embodiment, the number of decreasing corrections (5) is made larger than the number of increasing corrections (3), therefore the maximum amount of increase due to correction of the fuel gas and generating air supply amount can be held down, and excessive supply of fuel gas and generating air such that the individual fuel cells reach an anomalous temperature can be reliably prevented, even if the changes in the outside environment or a temporary unstable control state occurs, etc. Moreover, because there are a large number of decreasing corrections, the amount of fuel supplied is greatly decreased in cases where the generating chamber temperature is held within the monitoring temperature band even when the fuel supply amount is low due to differences between individual fuel cells, therefore wasteful fuel gas consumption can be reliably restrained while maintaining the performance of the individual fuel cells.

Next, as shown in FIG. 9, in the present embodiment, 720° C., which is higher than the monitoring temperature band W maximum temperature value (Tb), is deemed the cooling temperature (Tc); when the individual fuel cells 84 generating chamber temperature (T1) exceeds this cooling temperature (Tc), a large amount of generating air is introduced into the electrical generating chamber 10 of fuel cell module 2 by the reforming air flow regulator unit 44; this air forcibly cools the fuel cell assembly 12. Thus by using the present embodiment, anomalous high temperatures in the individual fuel cells can be reliably prevented even during the period described below during which correction of the amount of fuel supplied is prohibited (the adaptive control prohibition period); furthermore it is acceptable not to stop operation, therefore losses due to operation stoppage can be reliably reduced.

In addition, as shown in FIG. 9, in the present embodiment, the band of temperatures (≥800° C.) higher than the monitoring temperature band W maximum temperature value (Tb) and cooling temperature (Tc), and the band of temperatures (<500° C.) lower than the monitoring temperature band W minimum temperature value (Ta) are set as the anomalous temperature band, and operation of the fuel cell is restricted when the generating chamber temperature (T1) of the individual fuel cells 84 reaches this anomalous temperature band. Specifically, the fuel cell operation itself is stopped, the electrical generation operation of the fuel cell is stopped, the amount of fuel gas supplied is decreased, warnings are issued, etc. Thus by using this embodiment, the individual fuel cells 84 can be reliably prevented from going into an anomalous state even when there is an anomalous state in which the fuel supply control characteristics cannot be adapted to changes in the outside environment (temperature, humidity, etc.), or to differences between individual fuel cells 84.

Figure 12:
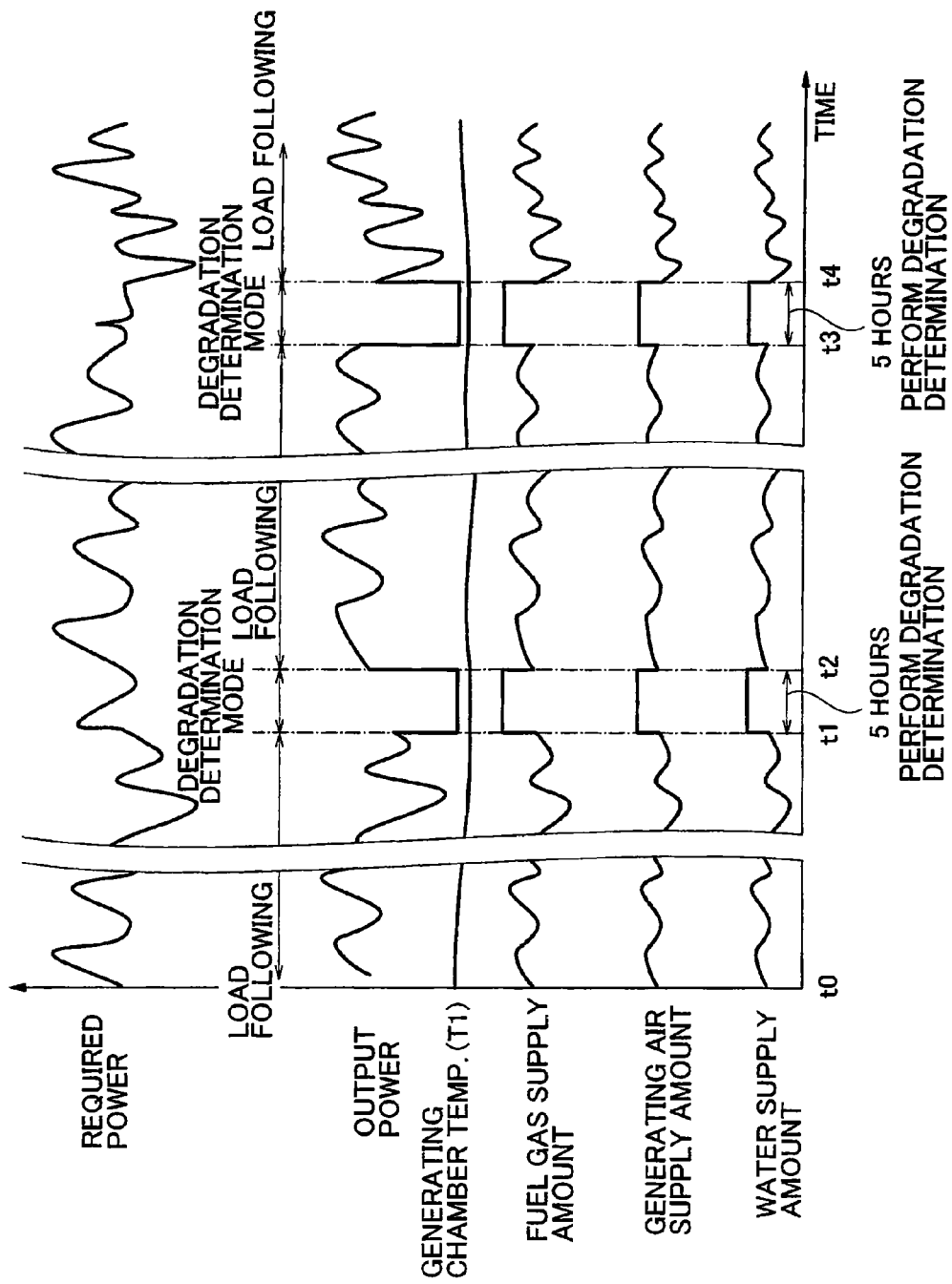
FIG. 12 is a timing chart showing the operational state for determining degradation in a solid oxide fuel cell device (SOFC) according to an embodiment of the present invention.

Next, referring to FIG. 12, the determination of individual fuel cell degradation according to the present embodiment will be explained. FIG. 12 is a timing chart showing the operational state for determining degradation in a solid oxide fuel cell device (SOFC) according to an embodiment of the present invention. The vertical axis indicates the amount of generation required, the output power amount, the generating chamber temperature (T1), the fuel gas supply amount, the generating air supply amount, and the water supply amount; the horizontal axis indicates time. It is known that individual fuel cells 84 degrade with usage over time. When individual fuel cells 84 degrade, characteristics of the individual fuel cells 84 change, so various countermeasures are required. Therefore in the present embodiment degradation of the individual fuel cells is determined using the degradation determining mode shown in FIG. 12.

In the present embodiment, a degradation determination is executed every predetermined time period (e.g. 2 weeks) starting from t0 when SOFC operation is commenced. When the degradation determination is performed, the outside air temperature and outside humidity must be in a predetermined range (e.g. outside air temperature: 5-30° C.; outside humidity: 30-70%).

Specifically, the degradation determining mode operation is executed over time t1 through t2 (e.g. 5 hours) shown in FIG. 12 to determine degradation. In this degradation determining mode, the amount of fuel gas supplied, amount of generating air supplied and amount of water supplied are respectively maintained at supply amounts (a certain fixed value) corresponding to the maximum rated generation amount output of 700 watts (=the degradation determination output power amount). The generating operation using this type of fixed value is executed for a predetermined time (5 hours). The operational state of the individual fuel cells stabilizes (i.e., the generating chamber temperature stabilizes) when this predetermined time elapses. Note that during the degradation determining mode operation, the output power amount is set at zero.

Next, after a predetermined period of generating operation elapses (time t2), a determination is made as to whether the generating chamber temperature (T1) is higher than the above-described reference temperature T0 by a predetermined temperature (e.g., 30° C.); if it is, a determination is made that the individual fuel cell has degraded. This predetermined temperature is higher than the above-described maximum temperature value (Tb) in the monitoring temperature band W. The reason the temperature rises when degradation occurs is that joule heat and the like is generated by an increase in internal resistance in the fuel cell stack 14 due to degradation of the individual fuel cells themselves, or degradation of the current collector 102 which electrically connects each of the individual fuel cell units 16. When it is thus determined that individual fuel cells have degraded, the operating state of the SOFC must be changed as explained below.

Figure 13:
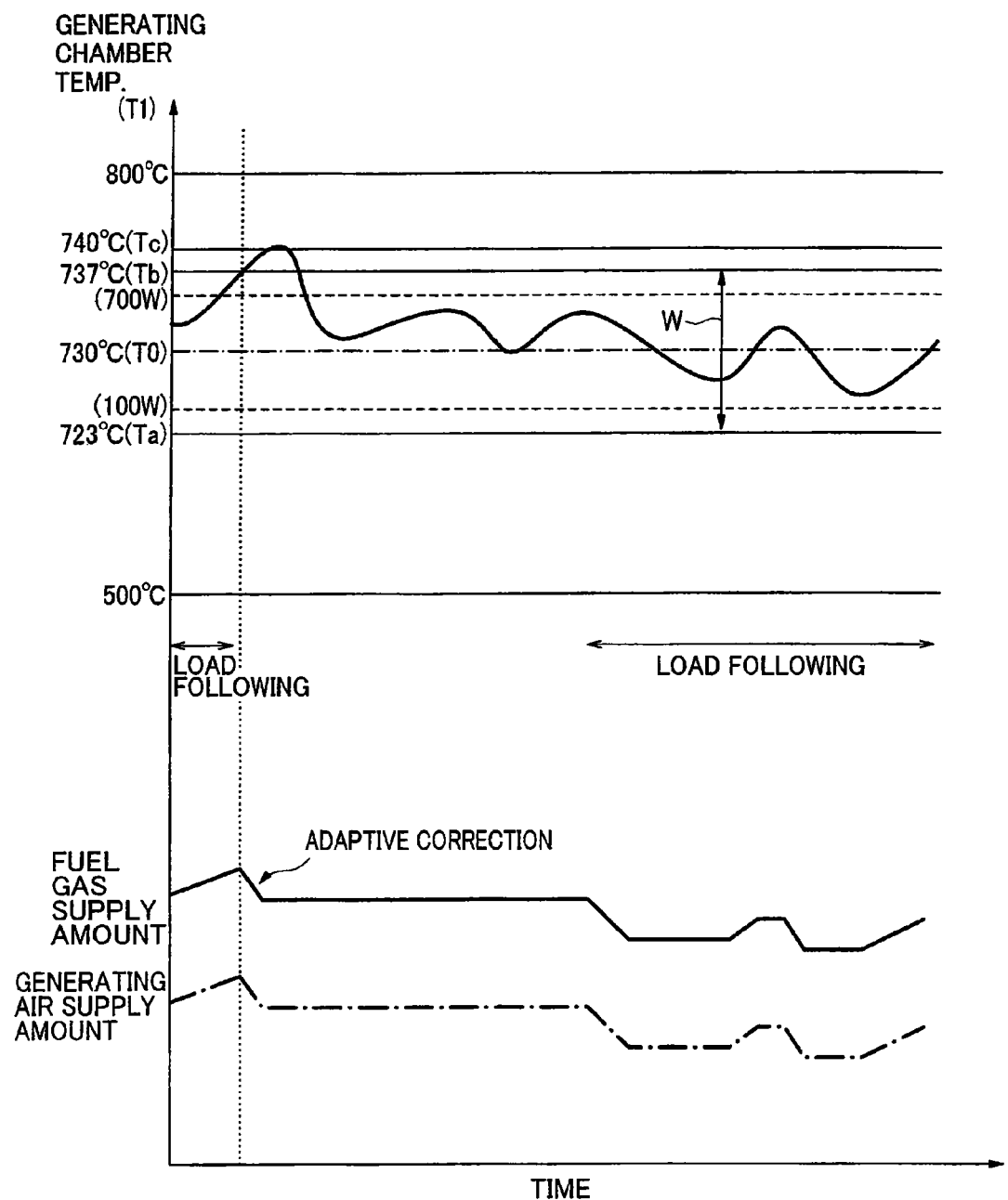
FIG. 13 is a timing chart showing the operational state when individual fuel cells have degraded during load following, in which the generation output value is changed in response to the amount of generation required of a solid oxide fuel cell device (SOFC) according to an embodiment of the present invention.

Next, referring to FIG. 13, the operating state at the time of degradation of an individual fuel cell during load following according to the present embodiment will be explained. FIG. 13 is a timing chart showing the operational state when individual fuel cells have degraded during load following, in which the generation output value is changed in response to the amount of generation required of a solid oxide fuel cell device (SOFC) according to an embodiment of the present invention.

As shown in FIG. 13, when it is determined that individual fuel cells 84 have degraded, the temperature of the degraded individual fuel cells 84 measured when output was stable is deemed to be the rated reference temperature (T0=730° C.); a new monitoring temperature band W is set in which a temperature 7° C. below this rated reference temperature (T0) is deemed to be the minimum temperature value (Ta=723° C.), and a temperature 7° C. above that temperature is deemed to be the maximum temperature value (Tb=737° C.). Thus in the present embodiment when the individual fuel cells 84 degrade the monitoring temperature band W is changed to a higher temperature band, and the monitoring temperature band W width is narrowed.

Furthermore, if it is determined that the individual fuel cells 84 are degraded, the monitoring temperature band W is changed, and the cooling temperature (Tc) which is the standard for forcibly cooling the fuel cell assembly 12 is also changed to the high temperature side at 740° C. By this means, when the individual fuel cells 84 degrade, even during the period when correction of the fuel supply amount described below is prohibited (the adaptive control prohibition period), the individual fuel cells can be reliably prevented from going to an anomalous high temperature, and since it is acceptable not to stop operation, losses from operation stoppage can also be reliably prevented.

Figure 14:
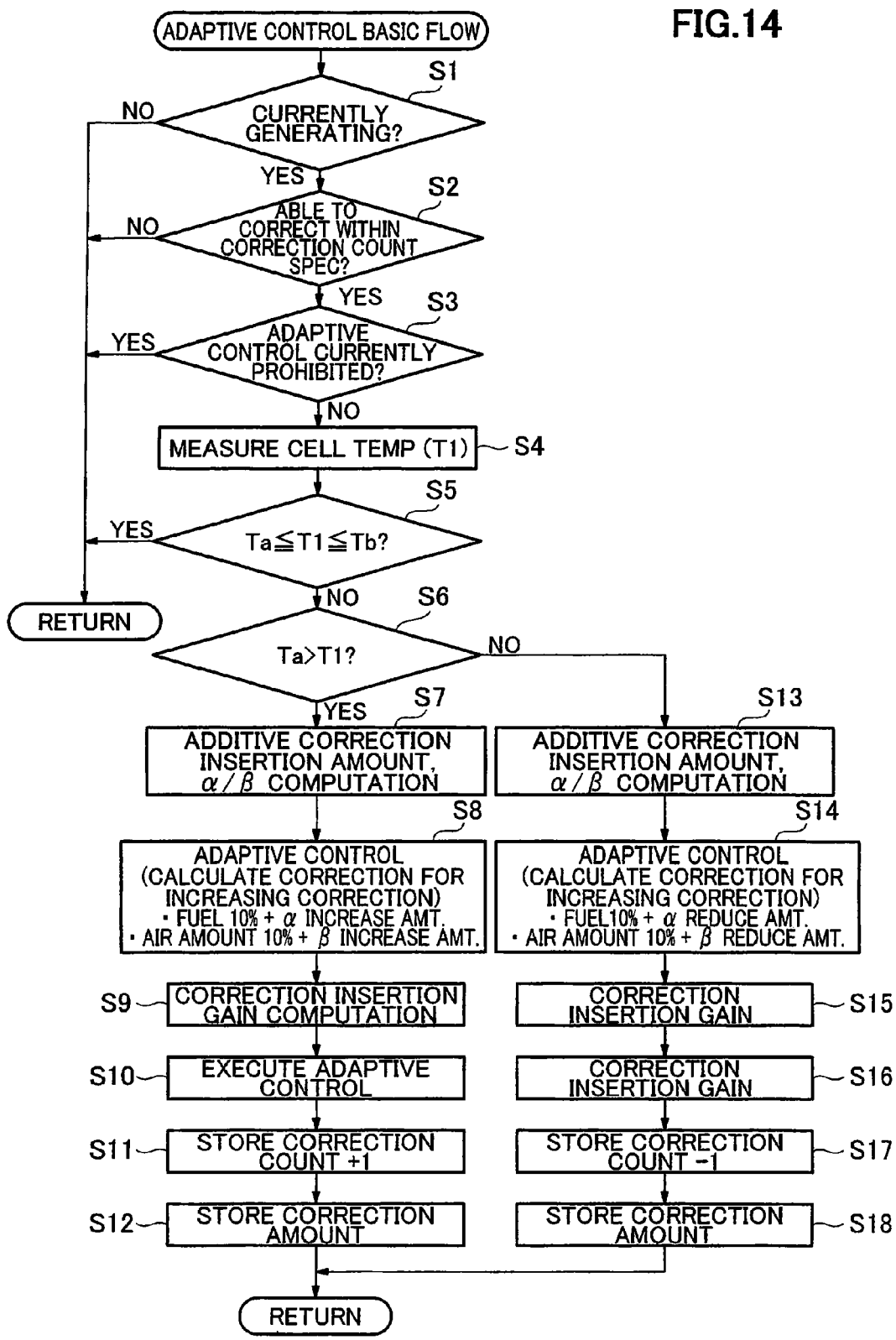
FIG. 14 is a flow chart showing the basic adaptive control flow when load following by changing the generation output value in response to the amount of generation required of a solid oxide fuel cell device (SOFC) according to an embodiment of the present invention.

Next, referring to FIG. 14, the basic flow of adaptive control according to the present embodiment will be specifically explained. FIG. 14 is a flow chart showing the basic adaptive control flow when load following by changing the generation output value in response to the amount of generation required of a solid oxide fuel cell device (SOFC) according to an embodiment of the present invention. In FIG. 14, an S denotes the various steps.

First, in S1, a determination is made as to whether the fuel cell module 2 is in a generating operation, i.e., whether it is in an operating state other than at startup or shutdown in which generation can be stably performed.

In this S1, if in the generating operation, the system advances to S2, and a determination is made as to whether it is possible to correct within the stipulated number of corrections. Specifically, as described above, a determination is made as to whether up to 3 increasing corrections or up to 5 decreasing corrections have been performed.

If an increasing correction or a decreasing correction is possible, the system advances to S3, and a determination is made as to whether adaptive control is currently prohibited. Adaptive control is prohibited in the following cases. First, within 5 hours of the previous correction, the individual fuel cells are not stable, so adaptive control is prohibited. By prohibiting correction, negative effects on the individual fuel cells due to over-correction are prevented, and the effects on fuel supply control characteristics due to changes in the outside environment and individual differences can be adapted to. Second, adaptive control is prohibited during the determination of individual fuel cell degradation described above. Third, within 5 hours of degradation correction, the individual fuel cells are not stable, so adaptive control is prohibited.

In S3, if it was determined that adaptive control was not being prohibited, the system advances to S4, and the generating chamber temperature (T1) of the individual fuel cells 84 is measured. Specifically, the temperature in the vicinity of the fuel cell assembly 12 is measured by the generating chamber temperature sensor 142, and that temperature is used as the generating chamber temperature of the individual fuel cells 84.

Next, advancing to S5, a determination is made as to whether generating chamber temperature (T1) is within the above-described monitoring temperature band W, which is to say whether "minimum temperature value (Ta)≤generating chamber temperature (T1)≤maximum temperature value (Tb)."

In S5, if generating chamber temperature (T1) is not within monitoring temperature band W, the system advances to S6, and a determination is made as to whether generating chamber temperature (T1) is less than minimum temperature value (Ta), which is to say whether "minimum temperature value (Ta)>generating chamber temperature (T1)." If generating chamber temperature (T1) is less than minimum temperature value (Ta), the system advances to S7, and the addition correction amounts α and β needed for determining the fuel gas and generating air increasing correction amount are computed. Here, α is the addition correction insertion amount of fuel gas supply, and β is the addition correction insertion amount of generating air supply; the values of these α and β increase as the amount of change in the generating chamber temperature after insertion of gas becomes larger than the reference value, the α and β also increase as the number of degradations of the individual fuel cells 84 increases.

Next, advancing to S8, since it is necessary to perform increasing correction of the amount of fuel gas and generating air supplied by adaptive control to raise the generating chamber temperature, the amount of correction in this increasing correction under adaptive control is computed. An amount equal to the α obtained in S7 added to the fixed value of 10% (10%+α) is the increased correction amount for fuel gas, and an amount equal to the β obtained in S7 added to the fixed value of 10% (10%+β) is the increased correction amount for generating air.

Next, advancing to S9, the correction insertion gain is calculated. The insertion of the correction amount of fuel gas and generating air in increasing correction is done more gradually than the insertion of the correction amount in decreasing correction described below. I.e., if the increasing correction time constant is B, and the decreasing correction time constant is A, B=3×A. The values of time constants A and B are increased as the number of degradations of individual fuel cell 84 increase, and fuel gas and generating air are gradually inserted. At this point, the speed at which the current value is increased is 0.5 A/minute.

Next, advancing to S10, adaptive control is executed. Specifically, an amount (10%+α) of fuel gas is increased and gradually inserted, an amount (10%+β) of generating air is increased and gradually inserted, and the generating chamber temperature is raised and brought within the monitoring temperature band W (see FIG. 9).

Next, advancing to S11, "+1" is stored as the number of increasing corrections.

Next, advancing to S12, the correction amount of this increasing correction is stored. A value for the amount of the correction increase is thus used as the fuel gas and generating air supply amount until the next generating chamber temperature (T1) declines below the minimum temperature value (Ta).

Next, if it is determined in S6 that the generating chamber temperature (T1) is not less than the minimum temperature value (Ta), then "generating chamber temperature (T1)>maximum temperature value (Tb)," so the system advances to S13.

A computation is made in S13 of the additive correction insertion amounts α and β needed to find the amount of decreasing correction for the fuel gas and generating air. Here, α is the addition correction insertion amount of fuel gas supply, and β is the addition correction insertion amount of generating air supply; the values of these α and β increase as the amount of change in the generating chamber temperature after insertion of gas becomes larger than the reference value, the α and β also increase as the number of degradations of the individual fuel cells 84 increases.

Next, advancing to S14, since it is necessary to perform decreasing correction of the amount of fuel gas and generating air supplied by adaptive control to reduce the generating chamber temperature, the amount of correction in this decreasing correction under adaptive control is computed. An amount equal to the α obtained in S13 added to the fixed value of 10% (10%+α) is the decreased correction amount for fuel gas, and an amount equal to the β obtained in S3 added to the fixed value of 10% (10%+β) is the decreased correction amount for generating air.

Next, advancing to S15, the correction insertion gain is calculated. The insertion of the correction amount of fuel gas and generating air in the decreasing correction is done, as described above, more quickly than the insertion of the correction amount in the increasing correction. I.e., if the temperature rise correction time constant is B, and the decreasing correction time constant is A, then B=3×A. The values of time constants A and B are increased as the number of degradations of individual fuel cell 84 increase, and fuel gas and generating air are gradually inserted. At this point, the speed at which the current value is raised is 0.5 A/minute.

Next, advancing to S16, adaptive control is executed. Specifically, an amount (10%+α) of fuel gas is decreased and quickly inserted, an amount (10%+β) of generating air is decreased and quickly inserted, and the generating chamber temperature is lowered and brought within the monitoring temperature band W (see FIG. 9).

Next, advancing to S17, "−1" is stored as the number of decreasing corrections.

Next, advancing to S18, the correction amount of this decreasing correction is stored. A value for the amount of the correction decrease is thus used as the fuel gas and generating air supply amount until the next generating chamber temperature (T1) exceeds the maximum temperature value (Tb).

In the adaptive control of the present embodiment explained above, there is no correction of the amount of fuel gas and generating air supplied before the individual fuel cells 84 reach a state at which electrical generation is possible, i.e., during startup and the like, when the individual fuel cells 84 and the reformer 20, etc. are in an unstable state, therefore the negative effects from correction of the amounts of fuel gas or generating air supplied in an unstable state can be reliably prevented.

Next, in the adaptive control of the present embodiment, a correction is made to the fuel supply amount by adding or subtracting a fixed correction amount (10%), which is a predetermined fixed amount, to the fuel supply amount obtained from the fuel supply control characteristics when the generating chamber temperature exceeds the minimum temperature value or the maximum temperature value and goes outside the monitoring temperature band W; in other words, the correction is made to the amount of fuel supplied using a fixed amount (10%) by open control rather than feedback control, therefore when the generating chamber temperature goes outside the monitoring temperature band W, the generating chamber temperature offset can be instantaneously and reliably restrained, and the individual fuel cells 84 placed in a stable state.

Also, because the correction amount for increasing correction (a fixed amount) and the correction amount for decreasing correction (a fixed amount) are the same amounts (both 10%), adaptive control is greatly simplified. Furthermore, the same amount of correction of the fuel gas and generating air supply amount is made each time, even when the generating chamber temperature fluctuates outside the monitoring temperature band W due to changes in the outside environment or the like, so the generating chamber temperature can be reliably converged into the monitoring temperature band W, and stable control can be implemented.

Also, with the adaptive control of the present embodiment, the corrected amount of supplied fuel gas and generating air is stored and held, and the fuel supply amount is varied in response to the amount of generation required based on this stored and held fuel supply amount, until next time the generating chamber temperature exceeds the minimum temperature value or the maximum temperature value, therefore control of the fuel supply amount can be reliably executed based on the fuel supply control characteristics in a state which accounts for differences between individual fuel cells.

With the adaptive control of the present embodiment, the increasing correction and decreasing correction amounts of the fuel gas and generating air supply are changed using the amount of change in the generating chamber temperature and the number of degradations in individual fuel cells, so the amount of correction of the fuel supply amount can be optimally changed, which allows convergence characteristic relative to the outside air temperature and holding characteristic to be improved, so that individual fuel cell degradation restraint and electrical generation performance can be further improved.

Next, referring to FIG. 15, a first example of the monitoring temperature band change flow in the present embodiment will be explained. FIG. 15 is a flow chart showing a first example of changing the temperature band for monitoring in a solid oxide fuel cell device (SOFC) according to an embodiment of the present invention. In FIG. 15, an S denotes the various steps.

The first example of changing this temperature monitoring band is one in which the temperature monitoring band is changed and the temperature monitoring band is narrowed when individual fuel cells degrade.

First, in S21, the rated reference temperature T0 is read in. This rated reference temperature is the generating chamber temperature detected by the generating chamber temperature sensor 142 in a stable operating state the fuel cell is installed, or after the above-described determination of fuel cell degradation is made.

Next, advancing to S22, a determination is made as to whether the above-described degradation correction is present. If there is no degradation correction being implemented, the individual fuel cells 84 is still in a non-degraded state, so the system advances to S23, and the monitor reference temperature (Tz) and monitoring temperature band (Ta, Tb) are set as shown below. In this case, the monitoring temperature band (Ta, Tb) width is 20° C.

Tz=T0
Ta=T0−10° C.
Tb=T0+10° C.

If there is a degradation correction, the individual fuel cells 84 have been judged to have degraded some number of times, so the system advances to S24, and the monitor reference temperature (Tz) and monitoring temperature band (Ta, Tb) are set as shown below. In this case, the width of the monitoring temperature band (Ta, Tb) is 14° C. when the first degradation is determined, 12° C. when the second degradation is determined, and 10° C. when the third degradation is determined; the greater the number of degradation determinations, the narrower becomes the width of the monitoring temperature band (Ta, Tb).

Tz=T0
Ta=T0−(7° C. first time/6° C. second time/5° C. third time)
Tb=T0+(7° C. first time/6° C. second time/5° C. third time)

Next, advancing to S25, the values respectively set in S23 and S24 are updated as the reference values (T0, Ta0, and Tb0) for the monitor reference temperature (Tz) and monitoring temperature band (Ta, Tb) shown below, and the monitoring temperature band is changed (see FIG. 13).

Tz=T0
Ta=Ta0
Tb=Tb0

Next, referring to FIG. 16, the correction count reset flow for resetting the number of corrections to the fuel supply amount in the present embodiment will be explained. FIG. 16 is a flow chart showing the flow for setting the number of corrections in order to zero-reset the number of corrections to the amount of fuel supplied in a solid oxide fuel cell device (SOFC) according to an embodiment of the present invention. In FIG. 16, an S denotes the various steps.

This correction count reset flow performs a correction in the above-described adaptive control to increase or decrease the amount of fuel gas and generating air supplied when the generating chamber temperature goes outside the temperature band, and stores that correction count (see FIG. 14, S11 and S17); when a determination of degradation in an individual fuel cell 84 is made, this stored correction count is reset. Thus even after an individual fuel cell degrades, correction of the amount of fuel gas and generating air supplied can be appropriately implemented, and optimal adaptive control is permitted.

First, in S31 a determination is made as to whether the system is in the degradation determination period. If it is in the degradation determination period, the system advances to S32, and the amount of correction to the fuel gas and generating air in the above-described adaptive control is reset to zero. Specifically, the system is returned to the basic fuel supply control characteristics shown in FIGS. 10 and 11. Next, the system advances to S33, and a determination is made as to whether the individual fuel cells have degraded.

If it is determined in S33 that individual fuel cells have degraded, the system advances to S34, and the correction count for the amount of fuel gas and generating air supplied in adaptive control is reset to zero. On the other hand, if it is determined in S33 that individual fuel cells have not degraded, the system advances to S35, and the correction amount for the amount of fuel gas and generating air supplied in adaptive control is restored to a point prior to the zero reset in S32 (returned).

Figure 17:
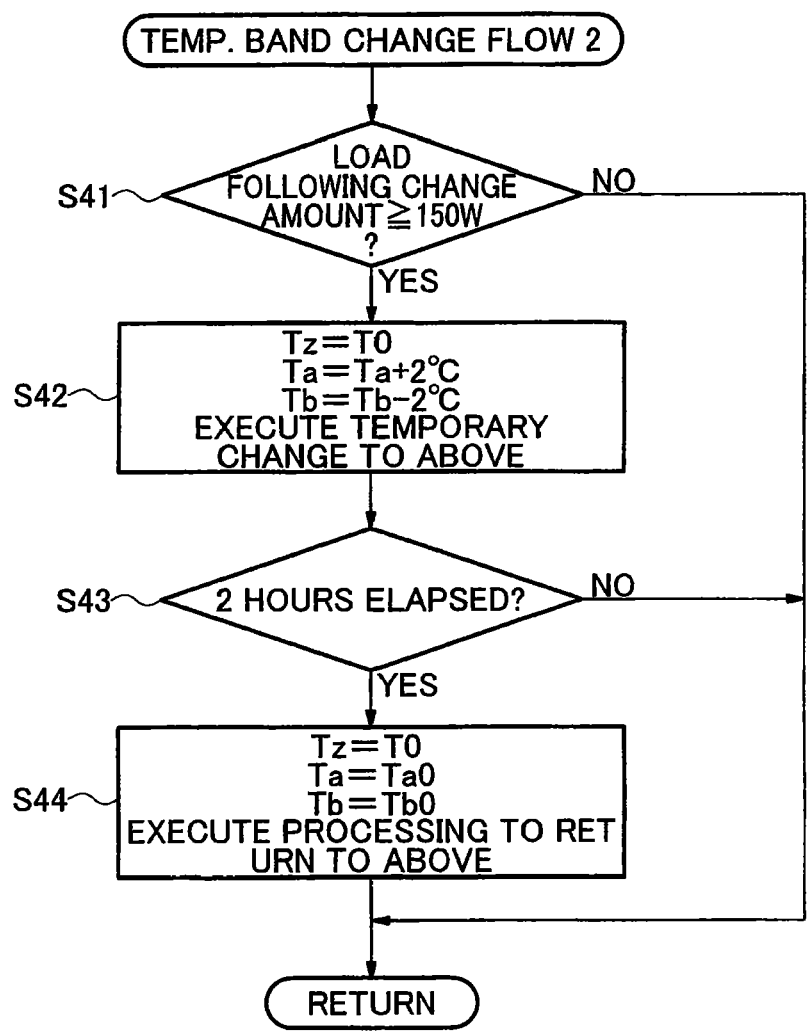
FIG. 17 is a flow chart showing a second example of changing the temperature band for monitoring in a solid oxide fuel cell device (SOFC) according to an embodiment of the present invention.

Next, referring to FIG. 17, a second example of the monitoring temperature band change flow in the present embodiment will be explained. FIG. 17 is a flow chart showing a second example of changing the temperature band for monitoring in a solid oxide fuel cell device (SOFC) according to an embodiment of the present invention. In FIG. 17, an S denotes the various steps.

The second example of changing this monitoring temperature band is one in which the width of the temperature band is temporarily narrowed when the amount of electrical generation changes greatly during load following.

First, in S41 a determination is made as to whether the amount of change (including both increase and decrease) in the amount of electrical generation during load following is ≥150 W; if so, the system advances to S42. In S42, the monitor reference temperature (Tz) and monitoring temperature band (Ta, Tb) are set as follows. In the second example, the width of the temperature band (Ta, Tb) is temporarily (for 2 hours as explained below) narrowed by 4° C.

Tz=T0
Ta=Tb+2° C.
Tb=Tb−2° C.

Next, advancing to S43, a determination is made as to whether 2 hours have elapsed; if so, the monitor reference temperature (Tz) and temperature band (Ta, Tb) are returned to values prior to the narrowing of the temperature band in S42, as shown below.

Tz=T0
Ta=Ta0
Tb=Tb0

Next, referring to FIG. 18, a third example of the monitoring temperature band change flow in the present embodiment will be explained. FIG. 18 is a flow chart showing a third example of changing the temperature band for monitoring in a solid oxide fuel cell device (SOFC) according to an embodiment of the present invention. In FIG. 18, an S denotes the various steps.

The third example of this change in the monitoring temperature band is one in which the temperature band and the width of temperature band is changed depending on the size (large, medium, small) of the target generation output (target generation amount).

First, in S51, the rated reference temperature T0 is read in. This rated reference temperature is the generating chamber temperature detected by the generating chamber temperature sensor 142 in a stable operating state the fuel cell is installed, or after the above-described determination of fuel cell degradation is made.

Next, advancing to S52, the target generation output (target generation amount) W1 is read in. Next, advancing to S53, a determination is made as to whether the target generation output W1 is greater than 650 W; if so, the system advances to S54. In S54, a correction amount A (A=+5° C.) for the monitor reference temperature (Tz) is determined, as is a correction amount C (C=Tb+2° C.) for the temperature monitoring band (Ta, Tb). In the third example, when the target generation output W1 is relatively large, the monitoring temperature band is changed toward the high temperature side and the maximum temperature value (Tb) is raised to broaden the temperature band toward the high temperature side.

Next, in S53, if it is determined that the target generation output W1 is not greater than 650 W, the system advances to S55, and a determination is made as to whether target generation output W1 is less than 550 W. If target generation output W1 here satisfies 550 W≤W1≤650 W, the system advances to S56. In S56, the monitor reference temperature (Tz) correction amount A (A=0° C.) is determined, as is the temperature band (Ta, Tb) correction amount C (C=0° C.). In other words, in the third example when target generation output W1 is of a normal size, no change is made to the temperature band, or to the width thereof.

Next, in S55, if it is determined that the target generation output W1 is smaller than 550 W, the system advances to S57. In S57, a correction amount A (A=−5° C.) for the monitor reference temperature (Tz) is determined, as is a correction amount C (C=Tb−2° C.) for the temperature monitoring band (Ta, Tb). In the third example, when the target generation output W1 is relatively small, the monitoring temperature band is changed toward the low temperature side and the value of the minimum temperature value (Ta) is lowered to broaden the temperature band toward the low temperature side.

Next, advancing to S58, the outside air temperature t1 detected by outside air temperature sensor 150 is read in. Next, advancing to S59, a determination is made as to whether outside air temperature t1 is above 30° C.; if so, the system advances to S60. In S60, a correction amount B (B=+5° C.) for the monitor reference temperature (Tz) is determined, as is a correction amount D (D=Tb+2° C.) for the temperature monitoring band (Ta, Tb). In the third example, when the outside air temperature t1 is relatively high, the temperature band is changed toward the high temperature side and the maximum temperature value (Tb) is raised to broaden the temperature band toward the high temperature side.

Next, in S59, if it is determined that the outside air temperature t1 is not above 30° C., the system advances to S61, and a determination is made as to whether outside air temperature t1 is below −20° C. Here, if the outside air temperature t1 satisfies −20° C.≤t1≤30° C., the system advances to S62. In S60, a correction amount B (B=0° C.) for the monitor reference temperature (Tz) is determined, as is a correction amount D (D=0° C.) for the temperature monitoring band (Ta, Tb). In other words, in the third example when the outside air temperature t1 is a normal temperature, no change is made to the temperature band, or to the width thereof.

Next, in S61, if it is determined that the outside air temperature t1 is below −20° C., the system advances to S63. In S63, a correction amount B (B=−5° C.) for the monitor reference temperature (Tz) is determined, as is a correction amount D (D=Ta−2° C.) for the temperature monitoring band (Ta, Tb). In the third example, when the outside air temperature t1 is relatively low, the monitoring temperature band is changed toward the low temperature side and the value of the minimum temperature value (Ta) is lowered to broaden the temperature band toward the low temperature side.

Next, advancing to S64, using the monitoring reference temperature correction amounts A and B and the monitoring temperature band correction amounts C and D determined in the above-described S54, S56, S57, S60, S62, and S63, the monitor reference temperature (Tz) and monitoring temperature band (Ta, Tb) are calculated using the following computations.

Tz=T0+A+B
Ta=Tz+C+D
Tb=Tz+C+D

Next, advancing to S66, the values calculated in S64 are updated as the reference values (T0, Ta0, and Tb0) for the monitor reference temperature (Tz) and monitoring temperature band (Ta, Tb) shown below, and the temperature band is changed.

Tz=T0
Ta=Ta0
Tb=Tb0

As explained above, in the present embodiment when fuel cell degradation is determined to have occurred, the minimum temperature value and/or the maximum temperature value of the monitoring temperature band are changed, therefore a much more precise adaptive control is possible relative to individual fuel cell degradation, outside air temperature, required amount of electrical generation (load), and various other states.

Also, a monitoring temperature band adapted to the outside air temperature can be set, thereby enabling optimal adaptive control.

A monitoring temperature band adapted to the amount of change in the amount of generation required (load) can be set, therefore even if the amount of generation required changes suddenly, mis-correction or delayed correction of the fuel supply amount, etc., can be restrained.

In low load periods when the amount of generation required is low, the monitoring temperature band is changed toward the low temperature side, so a rise in individual fuel cell temperature can be quickly reduced in an early stage, and damage to cells can be reliably prevented.

When individual fuel cell degradation is determined to have occurred, the correction amount to the amount of fuel gas and generating air supplied is increased or decreased, and the monitoring temperature band is also changed, mis-correction of the amount of supplied fuel gas and generating air associated with degradation can be reliably prevented even when fuel cell degradation has occurred.

The maximum temperature value and minimum temperature value of the monitoring temperature band are set centered on the temperature of the individual fuel cells measured after degradation, thereby enabling adaptive control taking into account individual differences between degraded individual fuel cells, so that damage to individual fuel cells can be reliably restrained.

When it is determined that a fuel cell degradation has occurred, a change is made to reduce the width of the monitoring temperature band, therefore temperature changes in the fuel cells can be greatly restrained in degraded individual fuel cells, thereby reducing the damage to individual fuel cells associated with temperature changes therein, and enabling the maintenance of fuel cell durability.

Also, adaptive control is stopped during a predetermined period when individual fuel cells degrade, and adaptive control is executed in the changed temperature band after the elapse of this predetermined period, therefore false determinations caused by the fluctuating portion of the correction amount due to the increase or reduction of the fuel gas and generating air supply correction amount can be prevented.

Also, the number of temperature reducing corrections and the number of temperature increasing corrections are reset when fuel cell degrades and the monitoring temperature band is changed, therefore the amount of correction to the fuel gas and generating air supply amount is appropriate, and optimal adaptive control can be achieved, even after degradation of a fuel cell.

What is claimed is:

1. A solid oxide fuel cell system that changes an output of power generation in response to an amount of power generation required, comprising:
    a plurality of solid oxide fuel cells disposed within a generating chamber;
    a fuel supply device that supplies fuel to the plurality of individual solid oxide fuel cells;
    a thermometer that measures a temperature of the generating chamber (T1); and
    a control device programed to change at least an amount of fuel supplied by the fuel supply device based on predetermined control schemes for supplying fuel, while changing the output of power generation in response to the required amount of power generation;
    wherein the following temperature bands are defined in the control device:
        (i) a temperature monitoring band defined by a minimum temperature value (Ta) and a maximum temperature value (Tb) for adaptive control, the minimum and maximum temperature values being predetermined based on a minimum amount and a maximum amount of rated electrical generation by the solid oxide fuel cell system;
        (ii) an upper limit temperature value for adaptive control in response to occurrence of anomalies, which is higher than the maximum temperature value (Tb) of the adaptive control temperature band, and a lower limit temperature value for adaptive control in response to occurrence of anomalies, which is lower than the minimum temperature value (Ta) of the adaptive control temperature band,
    the control device comprises (a) an anomaly response control device programed to perform anomaly response control by restricting operation of the fuel cell system when the generating chamber temperature (T1) is higher than the upper limit temperature value or lower than the lower limit temperature value and (b) an adaptive control device programed to perform adaptive control by correcting the amount of fuel supply based on a temperature signal from the thermometer so that the generating chamber temperature (T1) is kept within the temperature monitoring band when the generating chamber temperature (T1) drops below the minimum temperature value (Ta) or raises above the maximum temperature (Tb), and
    the adaptive control device comprises a temperature band changing device programmed to change the temperature monitoring band by changing the minimum temperature value (Ta) and/or the maximum temperature value (Tb) under predetermined conditions.

2. The solid oxide fuel cell system according to claim 1, wherein the temperature band changing device is programmed to change the minimum temperature value (Ta) and/or the maximum temperature value (Tb) in response to an outside air temperature.

3. The solid oxide fuel cell device according to claim 1, wherein the temperature band changing device is programmed to change the minimum temperature value (Ta) and/or the maximum temperature value (Tb) in response to an amount of fluctuation in the required power generation.

4. The solid oxide fuel cell system according to claim 1, wherein the temperature band changing device programmed to change the temperature monitoring band towards a lower temperature side when the required amount of power generation is low.

5. The solid oxide fuel cell system according to claim 1, further comprising a degradation determination device programmed to determine degradation in individual fuel cells,
    wherein the adaptive control device is programmed to increase or decrease an amount of correction to the fuel supply, and the temperature band changing device is programmed to change the temperature monitoring band, when the degradation determination device determines that a fuel cell has degraded.

6. The solid oxide fuel cell system according to claim 5, wherein the temperature band changing device is programmed such that in changing the temperature monitoring band, the temperature band changing device sets a new minimum temperature value (Ta) and a new maximum temperature value (Tb) of the changed temperature monitoring band so that a temperature of the individual fuel cells measured after degradation of the fuel cell is determined becomes a center of the changed temperature monitoring band.

7. The solid oxide fuel cell system according to claim 5, wherein the temperature band changing device is programed to change the temperature monitoring band such that the temperature monitoring band becomes narrower as a number of times increases at which the degradation determination device determines that an individual fuel cell has degraded.

8. The solid oxide fuel cell system according to claim 5, wherein the adaptive control device is programmed to halt the adaptive control for a predetermined time period when it is determined that an individual fuel cell has degraded and resume the adaptive control with the changed temperature monitoring band after the predetermined time elapses.

9. The solid oxide fuel cell system according to claim 6,
    wherein there are (i) a fuel supply reduction counter for counting the number of iterations of corrections made to reduce the amount of fuel supply in order to lower the generating chamber temperature when the generating chamber temperature exceeds the maximum temperature (Tb) and (ii) a fuel supply increase counter for counting the number of iterations of corrections to increase the amount of fuel supply in order to raise the generating chamber temperature when the generating chamber temperature exceeds the minimum temperature value (Ta), and the adaptive control device is programmed to (a), when a correction is made to reduce the amount of fuel supply, increment the fuel supply reduction counter if the fuel supply increase counter has no previously incremented count or decrement the fuel supply increase counter if the fuel supply increase counter has a previously incremented count and (b), when a correction is made to increase the amount of fuel supply, increment the fuel supply increase counter if the fuel supply reduction counter has no previously incremented count or decrement the fuel supply reduction counter if the fuel supply reduction counter has a previously incremented count,
    the adaptive control device is further programmed to prohibit a correction to reduce the amount of fuel supply if the fuel supply reduction counter reaches a predetermined reduction count and prohibit a correction to increase the amount of fuel supply if the fuel supply increase counter reaches a predetermined increase count, and
    the adaptive control device is further programmed to reset the fuel supply reduction counter and the fuel supply increase counter when it is determined that an individual fuel cell has degraded, and the temperature monitoring band is changed.

10. The solid oxide fuel cell system according to claim 1, wherein the adaptive control device comprises a correction amount changing device that changes an amount of correction to the amount of fuel supplied under predetermined conditions.

11. The solid oxide fuel cell system according to claim 10, further comprising a degradation determination device programmed to determine degradation in individual fuel cells,
wherein the correction amount changing device is programmed to increase the amount of correction to the amount of fuel supply when the degradation determination device determines that a fuel cell has degraded.

12. The solid oxide fuel cell system according to claim 10, wherein the correction amount changing device is programmed to change the amount of correction to the amount of fuel supply in response to a change in the generating chamber temperature while the power generation output is changed in accordance with the amount of power generation required.

13. The solid oxide fuel cell system according to claim 1, wherein further comprising a cooling control device programmed to cool the individual fuel cells when the generating chamber temperature (T1) is higher than the maximum temperature value (Tb) of the temperature monitoring band but lower than the upper limit temperature value.

* * * * *